US008953895B2

(12) United States Patent
Kawanishi et al.

(10) Patent No.: US 8,953,895 B2
(45) Date of Patent: Feb. 10, 2015

(54) IMAGE CLASSIFICATION APPARATUS, IMAGE CLASSIFICATION METHOD, PROGRAM, RECORDING MEDIUM, INTEGRATED CIRCUIT, AND MODEL CREATION APPARATUS

(75) Inventors: Ryouichi Kawanishi, Kyoto (JP); Tomohiro Konuma, Osaka (JP); Tsutomu Uenoyama, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 247 days.

(21) Appl. No.: 13/574,878

(22) PCT Filed: Oct. 6, 2011

(86) PCT No.: PCT/JP2011/005639
§ 371 (c)(1),
(2), (4) Date: Jul. 24, 2012

(87) PCT Pub. No.: WO2012/073421
PCT Pub. Date: Jun. 7, 2012

(65) Prior Publication Data
US 2012/0301032 A1    Nov. 29, 2012

(30) Foreign Application Priority Data
Nov. 29, 2010    (JP) ................................. 2010-265625

(51) Int. Cl.
*G06K 9/62* (2006.01)
*G06K 9/46* (2006.01)
*G06F 17/30* (2006.01)
(52) U.S. Cl.
CPC ................................ *G06F 17/30247* (2013.01)
USPC .......................................... 382/224; 382/190

(58) Field of Classification Search
None
See application file for complete search history.

(56) References Cited

U.S. PATENT DOCUMENTS

| 7,991,715 B2* | 8/2011 | Schiff et al. ...................... 706/20 |
| 8,731,308 B2* | 5/2014 | Fry et al. ........................ 382/224 |
| 8,732,180 B2* | 5/2014 | Lindahl et al. ................ 707/758 |
| 2004/0022440 A1 | 2/2004 | Akahori |
| 2005/0234896 A1* | 10/2005 | Shima et al. ...................... 707/3 |
| 2008/0270478 A1 | 10/2008 | Liu et al. |

FOREIGN PATENT DOCUMENTS

| JP | 2004-78939 | 3/2004 |
| JP | 2008-250444 | 10/2008 |

(Continued)

OTHER PUBLICATIONS

Computer English Translation of Japanese Patent No. JP2010-262531, pp. 1-13.*

(Continued)

*Primary Examiner* — Daniel Mariam
(74) *Attorney, Agent, or Firm* — Wenderoth, Lind & Ponack, L.L.P.

(57) ABSTRACT

The image classification apparatus extracts first features of each received image (S22) and second features of a relevant image relevant to each received image (S25). Subsequently, the image classification apparatus obtains a third feature by calculation using locality of the extracted first and second features, the third feature being distinctive of a target object of each received image (S26), and creates model data based on the obtained third feature (S27).

16 Claims, 25 Drawing Sheets

(56) References Cited

FOREIGN PATENT DOCUMENTS

| JP | 2008-276775 | 11/2008 |
|---|---|---|
| JP | 2009-31991 | 2/2009 |
| JP | 2009-217828 | 9/2009 |
| JP | 2010-67014 | 3/2010 |
| JP | 2010-262531 | 11/2010 |
| WO | 2010/087451 | 8/2010 |

OTHER PUBLICATIONS

Computer English Translation of WO 2010/087451 A1, pp. 1-11.*
International Search Report issued Nov. 1, 2011 in corresponding International Application No. PCT/JP2011/005639.
Google, "Add name tags in Picasa Web Albums", Oct. 30, 2010, [Online], Available: URL:http://picasa.google.com/support/bin/answer.py?hl=en&answer=93973.
Laurent Itti et al., "A Model of Saliency-based Visual Attention for Rapid Scene Analysis", IEEE Transactions on Pattern Analysis and Machine Intelligence, vol. 20, No. 11, pp. 1254-1259, Nov. 1998.
Hironobu Fujiyoshi, "Gradient-Based Feature Extraction -SIFT and HOG-", Technical Report of Information Processing Society of Japan, CVIM 160, pp. 211-224, Aug. 27, 2007 (with English abstract).
John C. Platt et al., "PhotoTOC: Automatic Clustering for Browsing Personal Photographs", (Fourth IEEE Pacific Rim Conference on Multimedia), Dec. 2003.
"Superpixel: Empirical Studies and Applications", pp. 1-3, Jun. 30, 2011, (http://www.cs.washington.edu/homes/xren/research/superpixel, http://www.stat.ucla-edu/~yuille/courses/canton/day5/day5examples/Superpixels.pdf).
Pedro F. Felzenszwalb et al., "Efficient Graph-Based Image Segmentation", International Journal of Computer Vision, vol. 59, No. 2, pp. 1-26, Sep. 2004, (http://people.cs.uchicago-edu/~pff/segment/, http://people.cs.uchicago.edu/~pff/papers/seg-ijcv.pdf).

* cited by examiner

| Image data number | Image metadata | | | | | |
|---|---|---|---|---|---|---|
| | File name | Shooting date/time | Latitude | Longitude | ISO | Exposure time | WB |
| ID1 | Image001.jpg | 2010/05/05 13:05 | +43.0523 | +142.7266 | 100 | 1/40 Second | Automatic |
| ID2 | Image002.jpg | 2010/05/05 14:13 | +43.0524 | +142.7260 | 200 | 1/40 Second | Automatic |
| ID3 | Image003.jpg | 2010/05/05 14:15 | +43.0531 | +142.7255 | 100 | 1/640 Second | Automatic |
| ID4 | Image004.jpg | 2010/05/05 14:16 | +43.0532 | +142.7251 | 100 | 1/640 Second | Automatic |
| ... | ... | ... | ... | ... | ... | ... | ... |

| Image data number | Feature information 52 | | | | | | | |
|---|---|---|---|---|---|---|---|---|
| | 52a | | | 52b | | | 52c | |
| | Color 1 | Color 2 | Color 3 | Locality 1 | Locality 2 | Locality 3 | Face | Number |
| ID1 | 100 | 25 | 50 | Vector 1-1 | Vector 1-2 | Vector 1-3 | ○ | 2 |
| ID2 | 25 | 50 | 100 | Vector 2-1 | Vector 2-2 | Vector 2-3 | ○ | 1 |
| ID3 | 30 | 100 | 45 | Vector 3-1 | Vector 3-2 | Vector 3-3 | × | 0 |
| ID4 | 45 | 85 | 45 | Vector 4-1 | Vector 4-2 | Vector 4-3 | × | 0 |
| ⋮ | ⋮ | ⋮ | ⋮ | ⋮ | ⋮ | ⋮ | ⋮ | ⋮ |

51

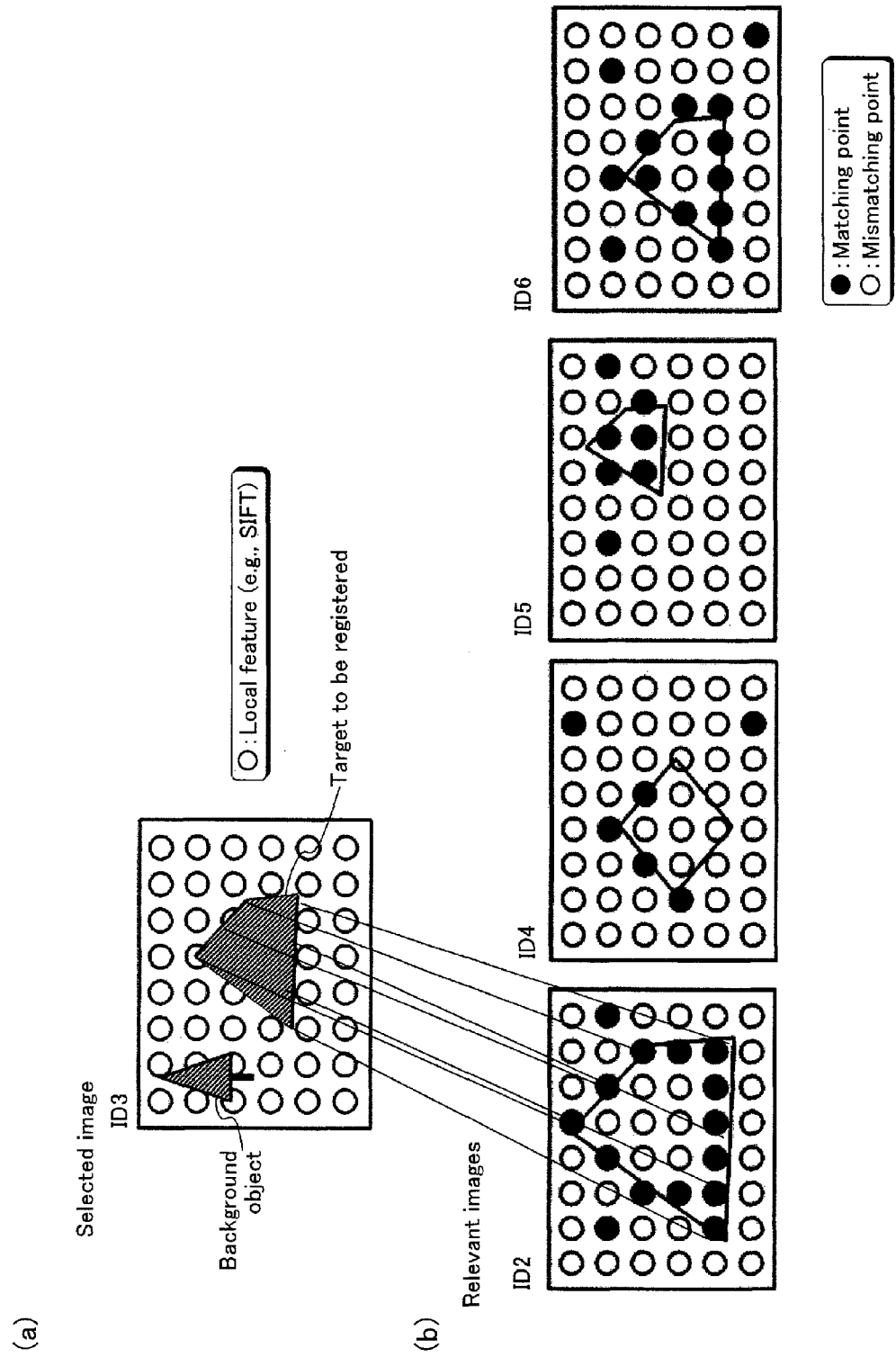

FIG. 11

| Image data number | Model data information | | | | | | | |
|---|---|---|---|---|---|---|---|---|
| | Feature 1 | Weight 1 | Feature 2 | Weight 2 | Feature 3 | Weight 3 | ... | Geometry relation |
| Model1-1 | Vector_s1-1-1 | 0.25 | Vector_s1-1-2 | 0.16 | Vector_s1-1-3 | 0.33 | ... | Vector_g1-1 |
| Model1-2 | Vector_s1-2-1 | 0.12 | Vector_s1-2-2 | 0.42 | Vector_s1-2-3 | 0.23 | ... | Vector_g1-2 |
| Model1-3 | Vector_s1-3-1 | 0.36 | Vector_s1-3-2 | 0.06 | Vector_s1-3-3 | 0.35 | ... | Vector_g1-3 |
| Model2 | Vector_s2-1 | 0.20 | Vector_s2-2 | 0.13 | Vector_s2-3 | 0.26 | ... | Vector_g2 |
| ... | ... | | ... | | ... | | ... | ... |

FIG.19
K: Khaki
Y: Yellow
B: Black
Selected image : ID3
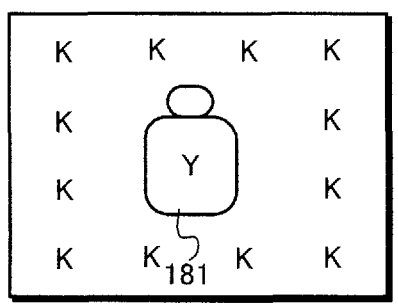
Relevant image : ID4
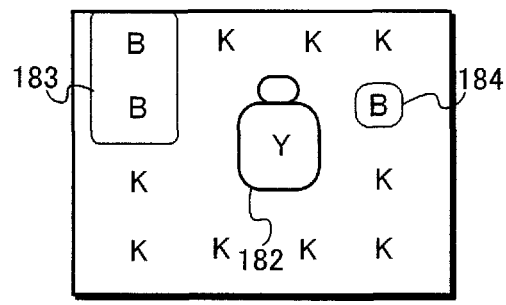

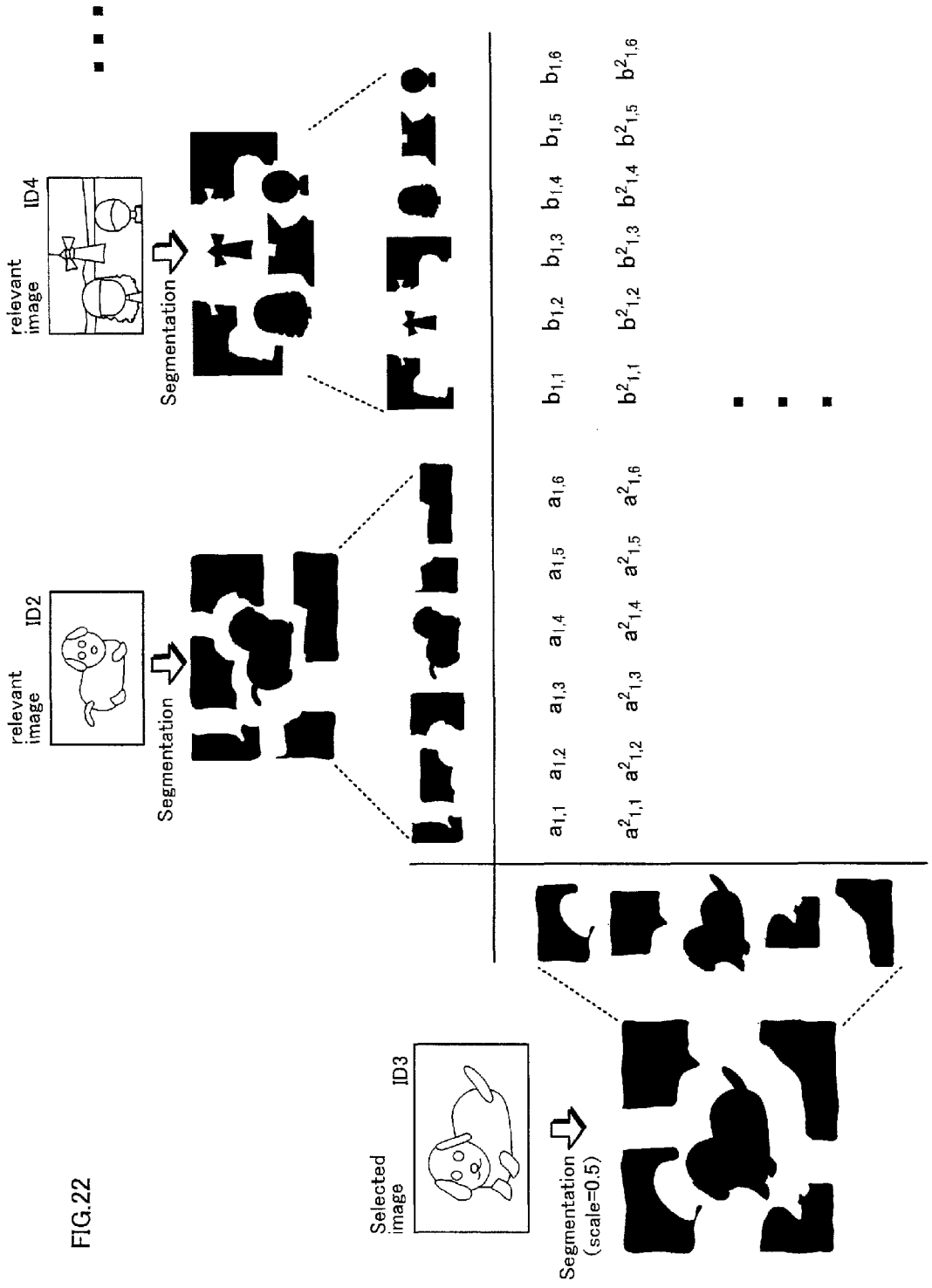

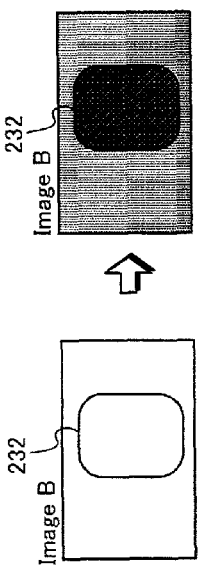
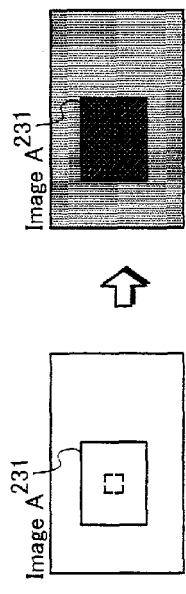
FIG.23A  FIG.23B
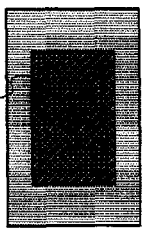
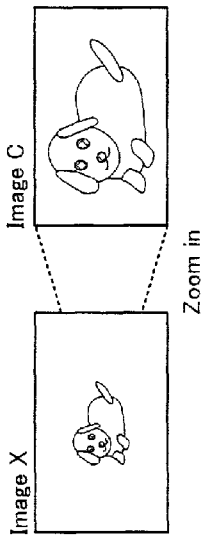
FIG.23C
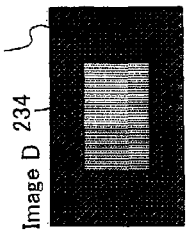
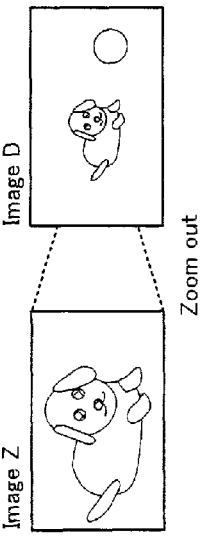
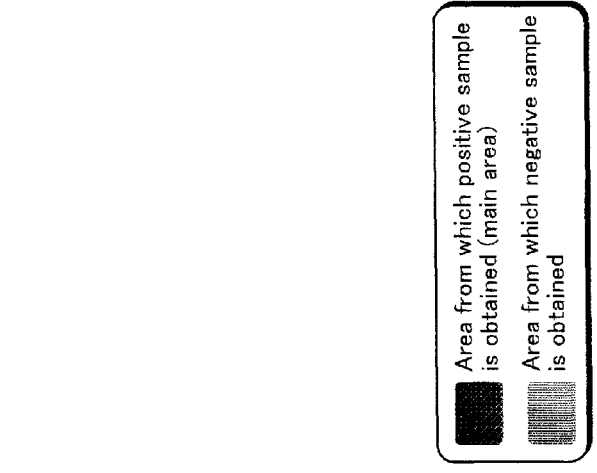
FIG.23D

IMAGE CLASSIFICATION APPARATUS, IMAGE CLASSIFICATION METHOD, PROGRAM, RECORDING MEDIUM, INTEGRATED CIRCUIT, AND MODEL CREATION APPARATUS

TECHNICAL FIELD

The present invention relates to a technology for creating model data used for classifying images.

BACKGROUND ART

In recent years, digital still cameras (DSC), single lens reflex cameras, cellular telephone cameras, and digital movie cameras that can take photographs have become common, making casual photography possible. Furthermore, recording media for saving image data have been increasingly larger in size.

This enables individual users to keep a large amount of image content. Accordingly, in order to help the users to efficiently find a desired image, more attention is being given to a technology for supporting classification of the images, such as attaching tags thereto.

For example, there have been proposed a technology for attaching tags of people's names to images by using face matching (Non-Patent Literature 1, for example), and a technology for supporting registration of facial images (Patent Literature 1, for example).

In addition, there has been a technology for classifying images by receiving support from a user with regard to suitability of the result of classification and targets for classification.

For example, according to Patent Literature 2, a user gives feedback when searching for images, and learning model is updated based on the feedback so as to conduct search that matches the user's intention.

In addition, according to Patent Literature 3, tags are attached to images by combining a predetermined ambiguous keyword and a specific keyword determined by a user.

CITATION LIST

Patent Literature

[Patent Literature 1]
Japanese Patent Application Publication No. 2009-31991
[Patent Literature 2]
Japanese Patent Application Publication No. 2008-276775
[Patent Literature 3]
Japanese Patent Application Publication No. 2010-67014

Non-Patent Literature

[Non-Patent Literature 1]
Google. (Oct. 30, 2010). Adding Name Tags on Picasa Web Album. [Online]. Available: URL:http://picasa.google.com/support/bin/answer.py?hl=jp&answer=93973
[Non-Patent Literature 2]
Itti L, Koch C, Niebur E, "A model of saliency-based visual attention for rapid scene analysis", *IEEE* vol. 20, no. 11, pp. 1254-1259, 1998

SUMMARY OF INVENTION

Technical Problem

Conventional technologies described above are useful to some degree for classification of distinctive objects such as faces, but not suitable for classification of various objects other than faces.

In addition, since images might include many kinds of objects, it is difficult to guess which object the user regards as the main target for classification when the images are classified with use of user's support.

The present invention has been achieved in view of the above background, and aims to provide an image classification apparatus that contributes to creation of more appropriate model data used for classification of images, by guessing an object of interest that a user wishes to classify.

Solution to Problem

A image classification apparatus pertaining to the present invention is an image classification apparatus for classifying images with use of model data, comprising: a receiving unit configured to receive images selected by a user from among a plurality of accumulated images; a first extraction unit configured to extract first features from each of the received images; a specification unit configured to specify, from among the accumulated images, a relevant image for each received image; a second extraction unit configured to extract second features from each of the specified relevant images; a calculation unit configured to obtain a third feature by calculation using locality of the extracted first and second features, the third feature being distinctive of a subject of the received images; and a model creation unit configured to create model data based on the third feature.

Advantageous Effects of Invention

According to the image classification apparatus pertaining to the present invention, it can be expected that the third feature especially reflects an object of interest that a user wishes to classify. Accordingly, the image classification apparatus can contribute to creation of appropriate model data.

BRIEF DESCRIPTION OF DRAWINGS

FIG. 4 is a table showing metadata of images.

FIG. 5 is a table showing feature information of the images.

FIG. 9 shows an example of matching between relevant images and a target to be registered, which is positioned at the center of the selected image.

FIG. 11 shows an example of model data.

FIG. 19 is a schematic view of a color histogram within images.

FIG. 22 shows calculation of a distinctive feature of a selected image by dividing images into areas.

FIGS. 23A-23D each show an example of a main area.

FIG. 25 shows a cloud-based server and the like.

DESCRIPTION OF EMBODIMENTS

The following describes embodiments of the present invention, with reference to the drawings.

Embodiment 1

According to embodiment 1, an image classification apparatus for organizing images or groups of video data creates model data based on images selected by a user. In creating the model data, the image classification apparatus obtains a distinctive feature of the selected image, and uses the obtained distinctive feature for creation of the model data. This enables the image classification apparatus to create model data that matches the user's intention, and to provide the user with a highly satisfactory result of classification when classifying images with use of the model data.

Figure 1:
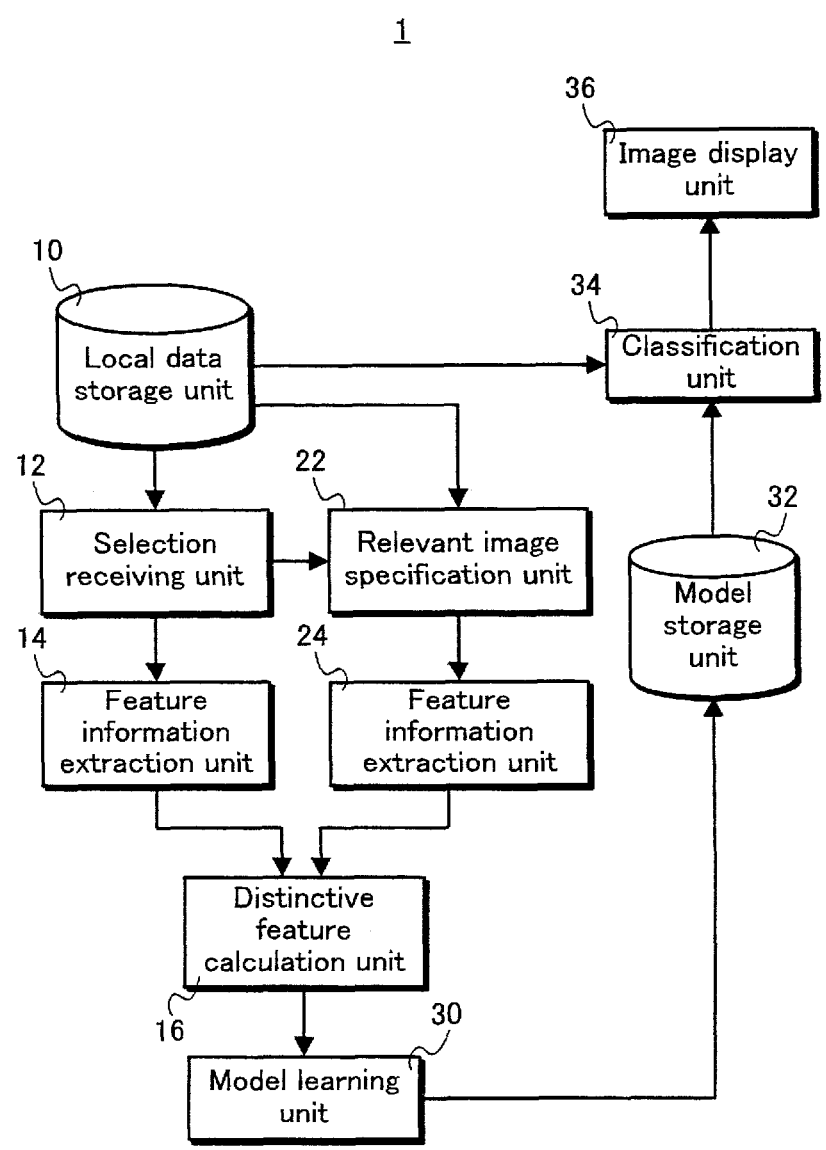
FIG. 1 is a functional block diagram of an image classification apparatus 1 pertaining to embodiment 1.

As shown in FIG. 1, an image classification apparatus 1 includes a local data storage unit 10, a selection receiving unit 12, a feature information extraction unit 14, a distinctive feature calculation unit 16, a relevant image specification unit 22, a feature information extraction unit 24, a model learning unit 30, a model storage unit 32, a classification unit 34, and an image display unit 36.

The local data storage unit 10 stores therein local data which a user uses in the home. Examples of the local data include photographic images taken by the user showing family members, a pet, various objects, landscapes or the like, and movie data captured by the user. The following description takes photographic images as an example.

Note that hardware of the local data storage unit 10 is composed of a recording medium, e.g., a large capacity media disc such as Hard Disk Drive (HDD) and Digital Versatile Disc (DVD) or a storage device such as a semiconductor memory.

The selection receiving unit 12 receives images selected by the user from among the images stored in the local data storage unit 10.

For example, the selection receiving unit 12 displays, on the display unit, a list of images and a message. The images include various objects, and an example of the message is "please select images including an object you wish to register as a model". Subsequently, the selection receiving unit 12 receives images selected by the user from the displayed list of images. The selected images include the object that the user wishes to register as a model.

Examples of an input device for making a selection include a touch screen and a mouse.

The feature information extraction unit 14 extracts feature information from the selected images that have been received by the selection receiving unit 12.

The feature information is classified in three types: metadata type; keypoint descriptor type; and specific object recognition type. Note that though the present embodiment describes all of these three types, not all of them are necessary, and only one or two of them may be used.

One example of the feature information of metadata type is various pieces of information included in Exchangeable image file format (Exif), such as Global Positioning System (GPS) information, various camera parameters, photography mode information and the like. The GPS information indicates the shooting date/time and the latitude/longitude.

The camera parameters include International Organization for Standardization (ISO) film speed, an exposure time period, shutter speed, white balance (WB) and the like. The ISO film speed adjusts brightness during photography, and the WB adjusts balance of color during photography.

Note that the photography mode information includes modes that are set by combining camera parameters used by general digital cameras, e.g., night mode, food mode and sport mode.

Examples of the feature information of keypoint descriptor type include Scale-Invariant Feature Transform (SIFT), Speeded Up Robust Features (SURF), and Histogram of oriented Gradient (HOG), each of which is a keypoint descriptor indicating local features.

SIFT is a feature descriptor indicating a feature of an area centering a feature point based on a low-dimension feature, such as an edge, color, or texture. HOG is a feature descriptor indicating a feature pertaining to the shape of an object.

Specific approaches of the above keypoint descriptors are described in detail in Patent Literature (Japanese Patent Application Publication No. 2008-250444) and Hironobu Fujiyoshi, "Gradient-Based Feature Extraction—SIFT and HOG—", Technical Report of Information Processing Society of Japan, CVIM 160, pp. 211-224, 2007. The above Patent Literature relates to a commercialized face detection device, and Hironobu Fujiyoshi relates to detection of a human body and general objects.

One example of the feature information of specific object recognition type is information for identifying a specific object (face, person or other various objects) in an image, i.e., information for recognizing a specific object.

The relevant image specification unit 22 determines images that are relevant (hereinafter, referred to also as "relevant images") to each of images that have been received by the selection receiving unit 12 (hereinafter, referred to also as "selected images") from among images stored in the local data storage unit 10.

A relevant image is determined based on any one of or combination of temporally relevance, geographical (positional) relevance, and relevance of a shooting pattern.

According to the temporally relevance, an image having the shooting date/time close to the shooting dates/times of selected images is determined as a relevant image.

According to the geographical (positional) relevance, an image that is geographically relevant to the selected images is determined as a relevant image. For example, an image with the latitude/longitude close to the latitudes/longitudes of the selected images is determined as a relevant image.

According to the relevance of shooting pattern, an image whose shooting pattern is relevant to the shooting patterns of the selected images is determined as a relevant image. Examples of the shooting pattern include shooting conditions and composition of photography. The shooting conditions include ISO film speed, an exposure time, shutter speed, and white balance (WB), for example.

Note that according to the temporally relevance and the geographical (positional) relevance, an image can be determined as a relevant image based on whether the image and the selected images are included in the same event. For example, a plurality of images are considered to be included in the same event if the shooting dates/times or the photography locations of the images are similar, and an image included in an event that includes the selected images can be determined as a relevant image.

In order to determine an event, a general approach can be used. For example, it is possible to use an approach described in John C. Platt, "photo TOC: Auto Clustering for Browsing Personal Photographs" (Fourth IEEE Pacific Rim Conference on Multimedia, 2003).

The feature information extraction unit 24 extracts feature information from the relevant images determined by the relevant image specification unit 22. Since information extracted from the relevant images is similar to information extracted by the feature information extraction unit 14, an explanation thereof is omitted.

The distinctive feature calculation unit 16 performs matching between feature information of the selected images and feature information of their relevant images. The distinctive feature calculation unit 16 then obtains a distinctive feature of the selected images by calculation using locality, for example. Here, locality means a geometrical pattern indicating the degree of match between features of the selected images and features of the relevant images. The distinctive feature indicates a feature of an object that a user wishes to register as a model among objects shown in the selected images. The details will be described later.

For example, assume that a user wishes to register the user's cat named "Tama" as a model. When the user selects a plurality of images showing "Tama", the distinctive feature calculation unit 16 obtains a feature distinctive of the cat "Tama" by calculation.

The model learning unit 30 creates model data with use of the distinctive feature obtained by the distinctive feature calculation unit 16, and stores the created model data in the model storage unit 32.

Model data is created by the following two approaches, for example.

As the first approach, the model learning unit 30 weights features of images according to importance of each feature, and uses the weighted features without change as model data. The first approach is desirable when the number of selected images is small.

The second approach is a machine learning method for creating model data with use of a classifier. For example, model data is created using Gaussian mixture model (GMM), Support Vector Machine (SVM) or the like, which are known to use a classifier. The second approach is statistical and accordingly desirable when the number of selected images is large to a certain extent.

Therefore, the first approach may be used when the number of the selected images is smaller than a predetermined threshold value, and the second approach may be used instead of the first approach when the number of the selected images is equal to or larger than the threshold value.

The classification unit 34 sets the model data stored in the model storage unit 32 into a classifier as reference data for classification. The reference data has been defined beforehand and includes classified models such as a face. Subsequently, the classification unit 34 inputs, in the classifier, the features extracted from the images stored in the local data storage unit 10. The classification unit 34 then judges which model data matches the input features.

During judgment, likelihood of images may be output along with the result of matching. The likelihood is a degree of reliability of the classification. In general, the larger the value of likelihood, the higher the degree of reliability.

The image display unit 36 displays images that match identifiers (for example, name, icon or image) of registered models on a screen.

As an example of display, images that match identifiers of "Tama" are displayed along with a message "images that match the registered model 'Tama' are shown below".

Note that when likelihood is associated to each image, the image display unit 36 may display only images having likelihood that is equal to or greater than a predetermined threshold value.

The following describes the flow of processing performed by the image classification apparatus, i.e., receiving images that have been selected by a user, obtaining a feature distinctive of the received images by calculation, and creating model data based on the obtained distinctive feature.

Figure 2:
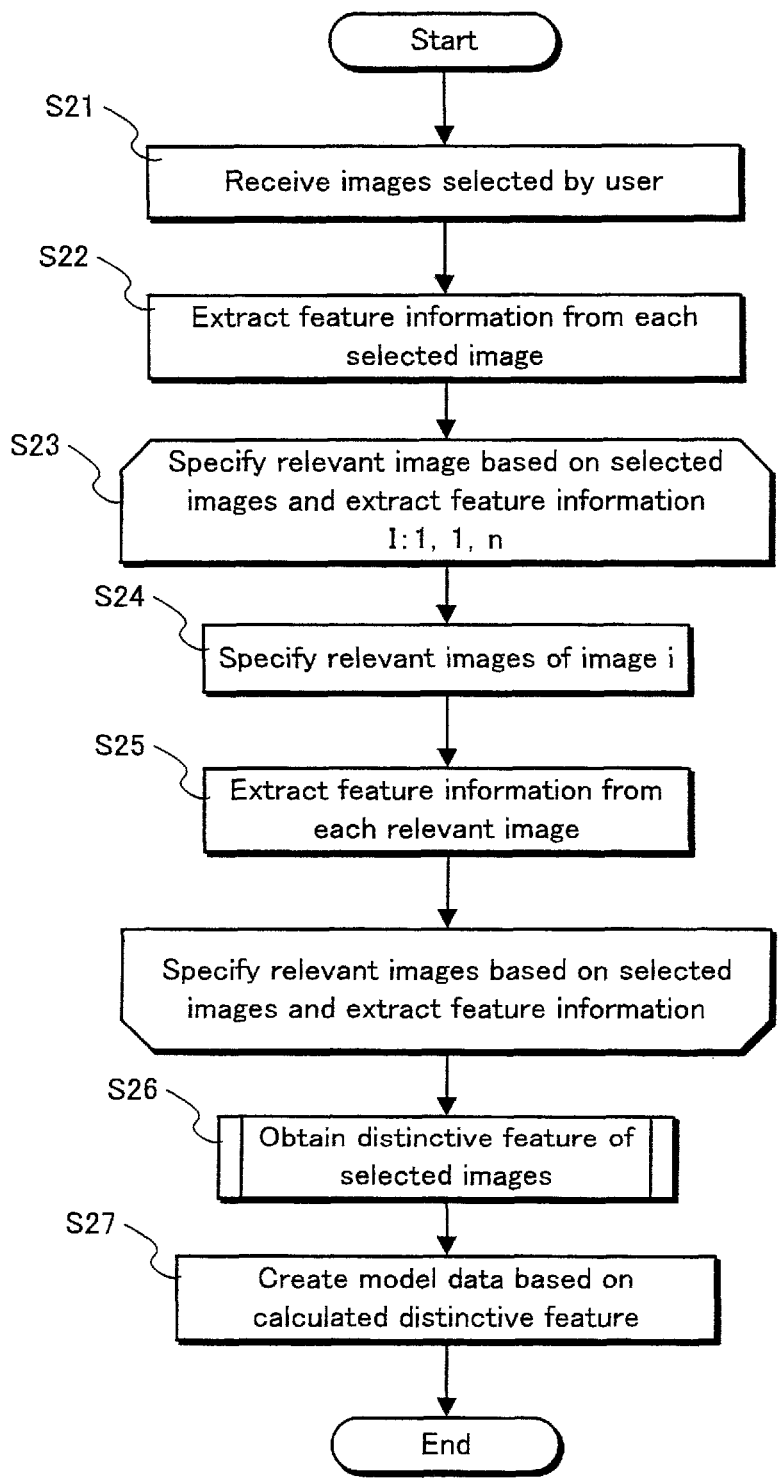
FIG. 2 is a flowchart showing the flow of processing performed by the image classification apparatus 1.

As shown in flowchart illustrated in FIG. 2, the selection receiving unit 12 displays a list of images stored in the local data storage unit 10, and receives, from a user, selection of images including an object that the user wishes to register as a model from among the displayed images (S21).

Figure 3A:
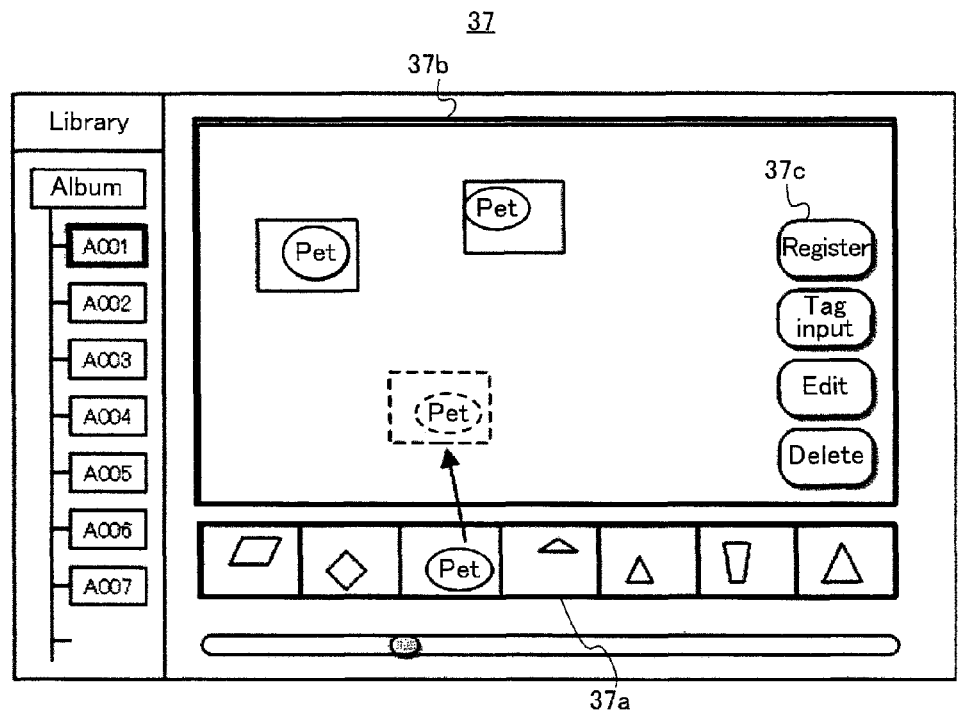
FIGS. 3A-3B show examples of user interface (UI) screens.
Figure 3B:
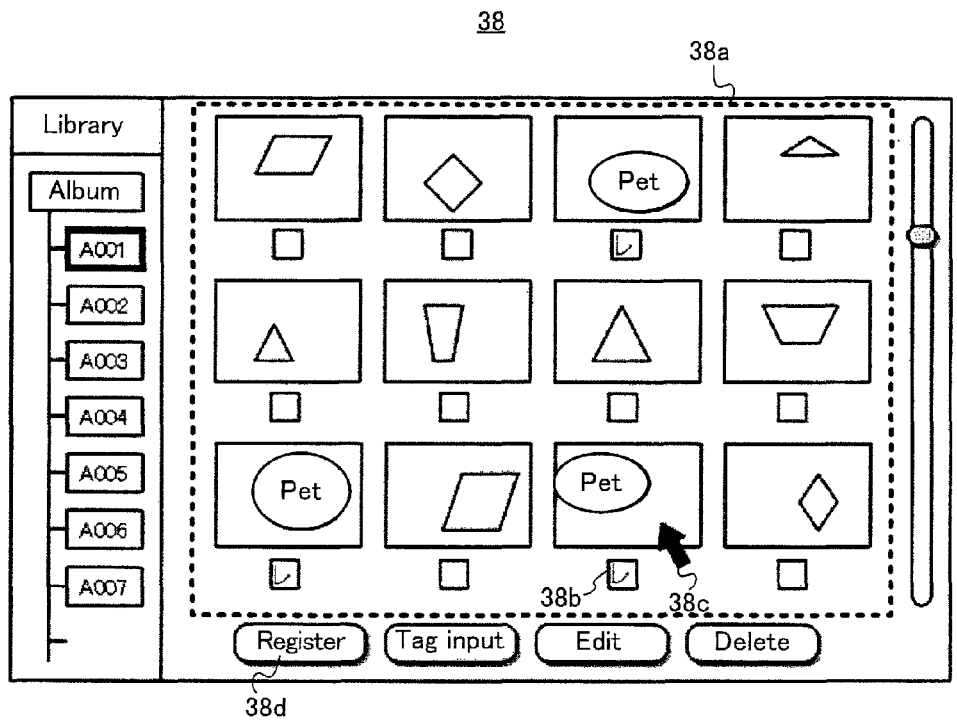

FIGS. 3A-3B show examples of user interface (UI) screens pertaining to step S21.

FIGS. 3A-3B show UI screens through which a user selects images including his/her pet (cat named "Tama").

In FIG. 3A, images stored in the local data storage unit 10 are displayed in a frame 37a, which is located in the lower part of a touch screen 37. The user can select an image by dragging and dropping the image with his/her finger from the frame 37a to a frame 37b located at the upper part of the touch screen 37.

In FIG. 3B, images stored in the local data storage unit 10 are displayed in a frame 38a of a screen 38. The displayed images are associated to their respective checkboxes 38b. The user can select ON or OFF for each image by pointing a mouse cursor 38c at the coordinates of a checkbox 38b corresponding to each image and clicking a mouse button.

In FIGS. 3A-3B, when receiving selection of a "register" button 37c or 38d, the selection receiving unit 12 determines images each in a selected state as selected images.

After receiving the selected images, the feature information extraction unit 14 extracts feature information from each of the selected images (S22).

The feature information extracted here is, as described above, classified into three types: metadata type; keypoint descriptor type; and specific object recognition type.

The feature information of metadata type is described with reference to FIG. 4. A table 40 in FIG. 4 shows image metadata 42 corresponding to image data number 41. The local data storage unit 10 thus manages images by providing each image with Exif format metadata.

By analyzing the metadata, the feature information extraction unit 14 extracts values of shooting date/time 42a, latitude/longitude 42b, ISO 42c, exposure time 42d, and WB 42e of each selected image (for example, "ID3") from the table 40.

The feature information of keypoint descriptor type and the feature information of object recognition type are described with reference to FIG. 5.

A table 50 in FIG. 5 shows feature information 52 corresponding to image data number 51.

An item set 52a composed of colors 1-3 represents a color histogram (for example, in YUV or RGB), using three representative colors. RGB or YUV can be in a general format, and a conversion between RGB and YUV can be performed via a general method.

An item set 52b composed of localities 1-3 represents values of low-dimension features such as texture, and values of high-dimension features indicating features of a local area centering a feature point or a shape of an object.

To be specific, features indicated by a keypoint descriptor such as SIFT, SURF and HOG are represented in a vector. In FIG. 5, the number of localities is simplified to be three, i.e., the locality 1 through the locality 3. Practically, however, the number of localities can be larger (for example, SIFT has 128 dimensions).

An item set 52c composed of face and number represents features of object recognition type. This set indicates whether a face appears in an image, and the number of faces included in a corresponding image.

Note that though the face in FIG. 5 simply shows whether a face appears or not in an image, a name of the face may also be identified with use of a general face recognition method. In addition, it is also possible to identify a person by using information such as a color or a shape of his/her clothes, and person detection information.

Further, a target for detection is not limited to humans. It is also possible to use a result obtained by using an object recognition technology represented by car detection, or pet detection for detecting dogs or cats, for example. Moreover, a target for detection is not limited to living things and may be an object such as a building and furniture. It is also possible to use, as feature information, a character sequence that appears in an image, which is a result of Optical Character Recognition (OCR).

After feature information is extracted, the processing enters a loop (S23 through S25) in which relevant images are identified based on the selected images and feature information is extracted from the relevant images.

Note that "i", "1", "1", "n" in step S23 respectively indicate a variable name, an initial value, an increment, and a last value (number of selected images).

The relevant image specification unit 22 specifies relevant images of an image i (S24).

The following describes an example case of specifying images associated with a same event. In this example case, assume that a plurality of continuous images taken within five minutes are treated to be included in the same event.

Figure 6:
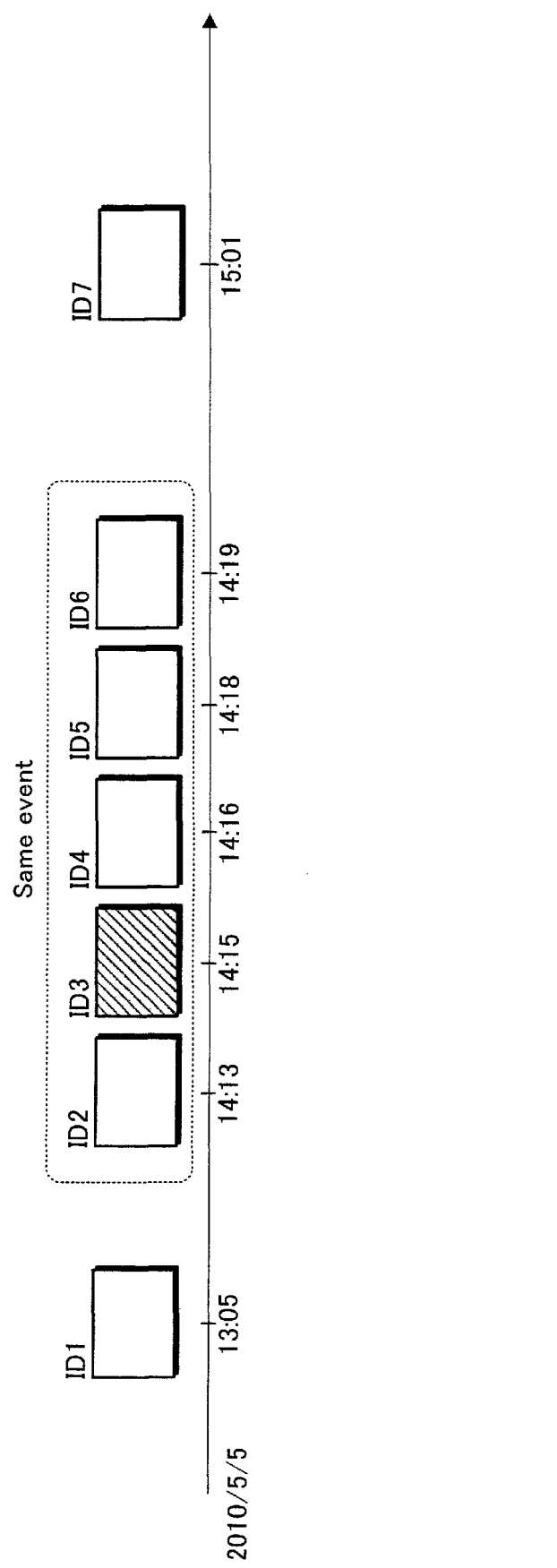
FIG. 6 shows determination of relevant images based on whether images are included in one event in consideration of time sequence.

According to such an assumption, as shown in FIG. 6, among seven images "ID1" through "ID7" taken on 2010 May 5, the selected image "ID3" and images taken within five minutes before or after 14:15, which is the shooting date/time of the selected image "ID3", are included in the same event. That is, the images "ID2" through "ID6" are included in the same event.

In this example, the relevant image specification unit 22 specifies four images, i.e., "ID2", "ID4", "ID5", and "ID6" as relevant images of "ID3".

When step S24 completes, the feature information extraction unit 24 extracts feature information from each of the specified relevant images (S25).

The extraction of feature information is performed in the same manner as step S22, and accordingly a description thereof is omitted.

Note that in the case of the relevant images shown in FIG. 6, the feature information extraction unit 24 extracts feature information from each of the four images, i.e., "ID2", "ID4", "ID5" and "ID6".

The image classification apparatus 1 repeats such processing of steps S24 and S25 for each of the selected images.

Subsequently, the distinctive feature calculation unit 16 extracts distinctive features of the selected images (S26), based on the feature information of each selected image that has been extracted in step S22, and the feature information of each relevant image that has been extracted in step S25.

Step S26 is described in detail with reference to FIGS. 7-10.

First, the distinctive feature calculation unit 16 performs matching between each selected image and relevant images corresponding thereto (S71).

Figure 8:
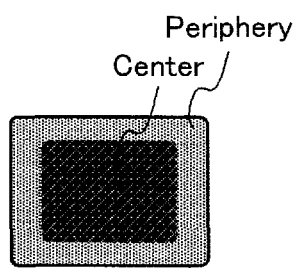
FIG. 8 indicates the center and the periphery of an image.

In subsequent steps S72 and S73, features are treated differently based on locality thereof. To be specific, when a matching point, at which the matching point is a point at which a feature of a selected image matches a feature of a relevant image, is found at the center of a selected image, a feature of the matching point is learned as a positive sample (i.e., the weight of the feature of the matching point is increased). On the contrary, when a matching point is found at the periphery of a selected image, a feature of the matching point is learned as a negative sample (i.e., the weight of the matching point is decreased). FIG. 8 shows an example of the center and the periphery of an image.

FIG. 9 shows an example of step S72.

FIG. 9 shows a selected image "ID3", and relevant images of the selected image "ID3", i.e., "ID2", "ID4", "ID5" and "ID6". The relevant images "ID2", "ID4", "ID5" and "ID6" include a target to be registered, which has been taken at various scales and from various angles.

In FIG. 9, a plurality of circles are arranged as a grid at regular intervals (for example, 20 pixels) in each image. Such circles each indicate a location from which a local feature is extracted. The local feature is indicated by SIFT and the like. Specifically, black circles in the relevant images are each a matching point with the selected image. On the other hand, white circles in the relevant images are mismatching points at which features do not match. In FIG. 9, matching points of one of the relevant images, i.e., "ID2" are connected to corresponding points of the selected image "ID3" with line segments.

As shown in this example illustrated in FIG. 9, matching points are likely to appear about the center of the relevant images on average. To be specific, there are three tendencies as follows.

Firstly, since images included in the same event in data owned by the same user are likely to contain the same object, relevant images with a high degree of match are likely to include the same object as that of the selected image.

Secondly, when matching points between the image selected by a user and a relevant image have a certain similarity in geometric shape, it is possible to determine a feature of the matching points pertaining to the geometric shape as a feature distinctive of a target to be registered. It is also possible to use the geometric shape as a distinctive feature.

Thirdly, when relevant images include a target to be registered, such a target object is likely to appear about the center of the images, since the object is what a user wishes to take.

Therefore, when it is judged that the matching points appear about the center of images based on average positions and dispersion of matching points, it is reasonable to weight the feature of the matching points as a distinctive feature of the target to be registered.

<Example of Calculating Weight>

The following describes an example of a specific method for calculating weight.

Weight of a distinctive feature is calculated as follows. Suppose that the number of selected images is N. In this case, when M images among the N images include a feature A whose degree of match is equal to or greater than a predetermined threshold value, weight of the feature A is obtained by calculating M/N. The degree of match can be calculated by squared sum of differences of components of a feature, for example. By setting weight higher for a distinctive feature that appears more frequently in selected images, it is possible to improve accuracy of classification. In addition, weight can be calculated by the following equation, where $S_{x,y}$ denotes the degree of match between images x and y that include a feature A, and SS denotes the sum of the degree of match among all images.

< Equation 1 >

$$SS = \sum_{i=1}^{N-1} \sum_{j=i+1}^{N} S_{i,j} \quad (1)$$

It is possible to normalize the range of the calculated weight to 0-1, for example.

In addition, it is possible to limit the entire area of an image, with use of SaliencyMap, etc., to a certain area having high saliency and calculate the degree of match using only the certain area. It is also possible to divide an image beforehand in units of sub-areas based on edge information, etc., and calculate the degree of match only among sub-areas wholly similar to one another when weighting a feature, for example. Note that non-Patent Literature 2 describes SaliencyMap in detail.

Figure 10A:
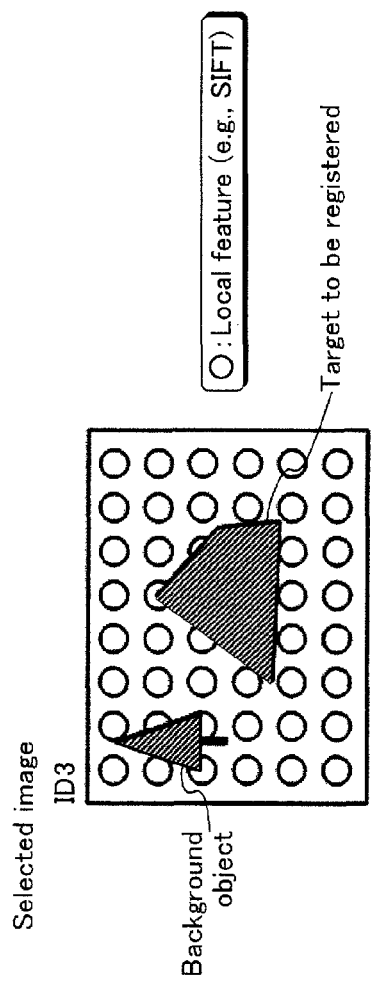
FIGS. 10A-10B show an example of matching between relevant images and a background object, which is positioned at the periphery of the selected image.
Figure 10B:
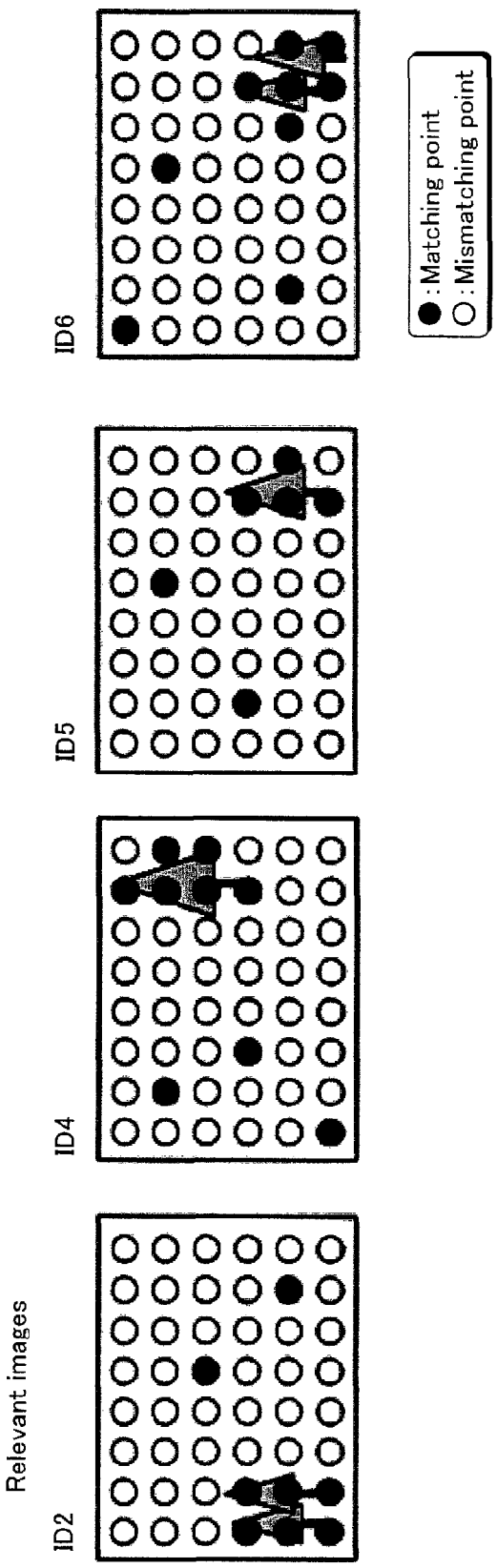

FIGS. 10A-10B show an example of step S73.

FIG. 10A shows a selected image "ID3", and FIG. 10B shows relevant images of the selected image "ID3", i.e., "ID2", "ID4", "ID5" and "ID6". In the relevant images, "ID2", "ID4", "ID5", and "ID6", black circles are matching points that match features of a background object in the selected image. On the other hand, in the relevant images, "ID2", "ID4", "ID5", and "ID6", white circles are mismatching points that do not match features of the background object in the selected image.

Here, the background object is irrelevant to a target to be registered. If the selected image and the relevant images are included in the same event, the background object of the selected image is likely to match background of the relevant images. However, since the background object is not an object that a user wishes to shoot, the background object is likely to appear at areas other than the center of the relevant images.

As shown in this example illustrated in FIGS. 10A and 10B, matching points are likely to appear about the periphery of the relevant images on average When it is judged that the matching points appear about the periphery of images based on average positions and dispersion of matching points, it is possible to determine the feature as a non-distinctive feature of the target to be registered.

Note that when there are a plurality of selected images, it is possible to determine a distinctive feature of a target to be registered by specifying a feature that is common to the plurality of selected images, judging whether such a common feature and a feature of the relevant images match, and eventually determining the matched feature as a distinctive feature, or by specifying features that are common to the plurality of selected images and relevant images, and determining a feature that further matches among the plurality of the selected images as a distinctive feature.

When distinctive features of the selected images are thus obtained, the model learning unit 30 creates, with use of the distinctive features, model data to identify the target to be registered (S27).

Model data may be created by simply using the obtained distinctive features as is.

Alternatively, it is possible to weight the distinctive features in accordance with the degree of match thereof, or it is also possible to store features for each of objects to be registered, which have been classified beforehand.

FIG. 11 shows an example of model data created by the model learning unit 30.

Registered model 1 (Model 1) is created, for example, by obtaining all distinctive features of selected images including a target to be registered and then calculating similarities among the distinctive features based on metadata of the images. Subsequently, the images are classified into three image groups based on whether the calculated similarities are equal to or greater than a predetermined value. Then three models (Model 1-1, 1-2, 1-3) can be obtained by creating models that are in one-to-one correspondence with the classified three image groups.

Registered model 2 (Model 2) is created as one model since all selected images have similarities of the distinctive features equal to or greater than the predetermine value.

Here, weighting is performed on the distinctive features in accordance with the degree of distinctiveness thereof, and the results of the weighting are obtained as weight. When an image is compared with a model during matching processing, a similarity between the image and the model is calculated as follows. First, the sum of feature×weight is obtained for each of the image and the model. Subsequently, the sum is multiplied by geometry relation for each of the image and the model. The similarity is obtained by comparing the obtained two values. If the similarity is equal to or greater than a predetermined threshold value $Thr_2$, it is judged that the image and the model match, for example.

Alternatively, it is also possible to create a statistical model via a conventional machine learning method such as GMM and SVM, by using all of the features that have been obtained by the distinctive feature calculation unit 16. In this case, it is possible to increase learning data as follows: when matching points of a feature are found close to the center of relevant images as shown in FIG. 9, such a feature is added as a positive sample that corresponds to a target to be registered; and when matching points of a feature are found close to the periphery of relevant images as shown in FIG. 10B, such a feature is added as a negative sample that does not correspond to the target.

Note that it is also possible to create a statistical model with use of weight and geometry relation shown in FIG. 11.

Further, it is possible to create a model that is more appropriate to a target to be registered without using all of calculable values indicating features in one feature space. To be specific, the one feature space is classified beforehand according to paradigms such as artificial objects, organisms, and text information, e.g., character sequences, and then a model is created in each of the classified feature spaces. Note that it is also possible to create a model by using, as a feature, frequency of appearance per se of a feature in each feature space.

After model data is output from the model learning unit 30 and stored in the model storage unit 32, the classification unit 34 classifies images with use of the stored model data.

The classification unit 34 judges, with use of the model data stored in the model storage unit 32, whether each of the images stored in the local data storage unit 10 includes a feature that matches the model data.

The judgment can be performed, for example, by comparing features extracted from the images with features of the model data shown in FIG. 11, and obtaining the degree of match therebetween. The degree of match may be corrected in accordance with weight corresponding to each feature.

When an image has obtained the degree of match equal to or greater than a predetermined value, the classification unit 34 provides the image with attribute information (tag) of a model that matches the image.

After the judgment, the image display unit 36 displays images that include objects registered as models by the user, classifying the images into groups according to the models.

As described above, registration of a model is performed, instead of by creating a model based only on selected images with use of a target to be registered as-is, by extracting images relevant to the selected images from the local data storage unit 10 and creating a model with use of the relevant images such that accuracy of classification increases within the local data. As a result, it is possible to easily register an object that a user wishes to classify, and accurately classify images including the object within local data.

Accordingly, a user can freely register an object that he/she wishes to register and easily search for images including the object.

Embodiment 2

Embodiment 2 relates to a structure for accurately classifying images that include a registered model by using a feature that is commonly included in local data when a user selects images including an object that he/she wishes to classify.

Note that in the present embodiment, components having the same functions as in embodiment 1 are given the same reference signs, and since the description of embodiment 1 applies in embodiment 2 as well, such description is omitted.

In embodiment 2, when model data is created based on images selected by a user, a feature commonly included in images in the local data is defined as a common feature. Subsequently, after judging commonalities of features of each selected image, contribution to a model is set lower for a higher commonality. By doing this, it is possible to create model data that achieves improved classification performance and is appropriate for a user.

Figure 12:
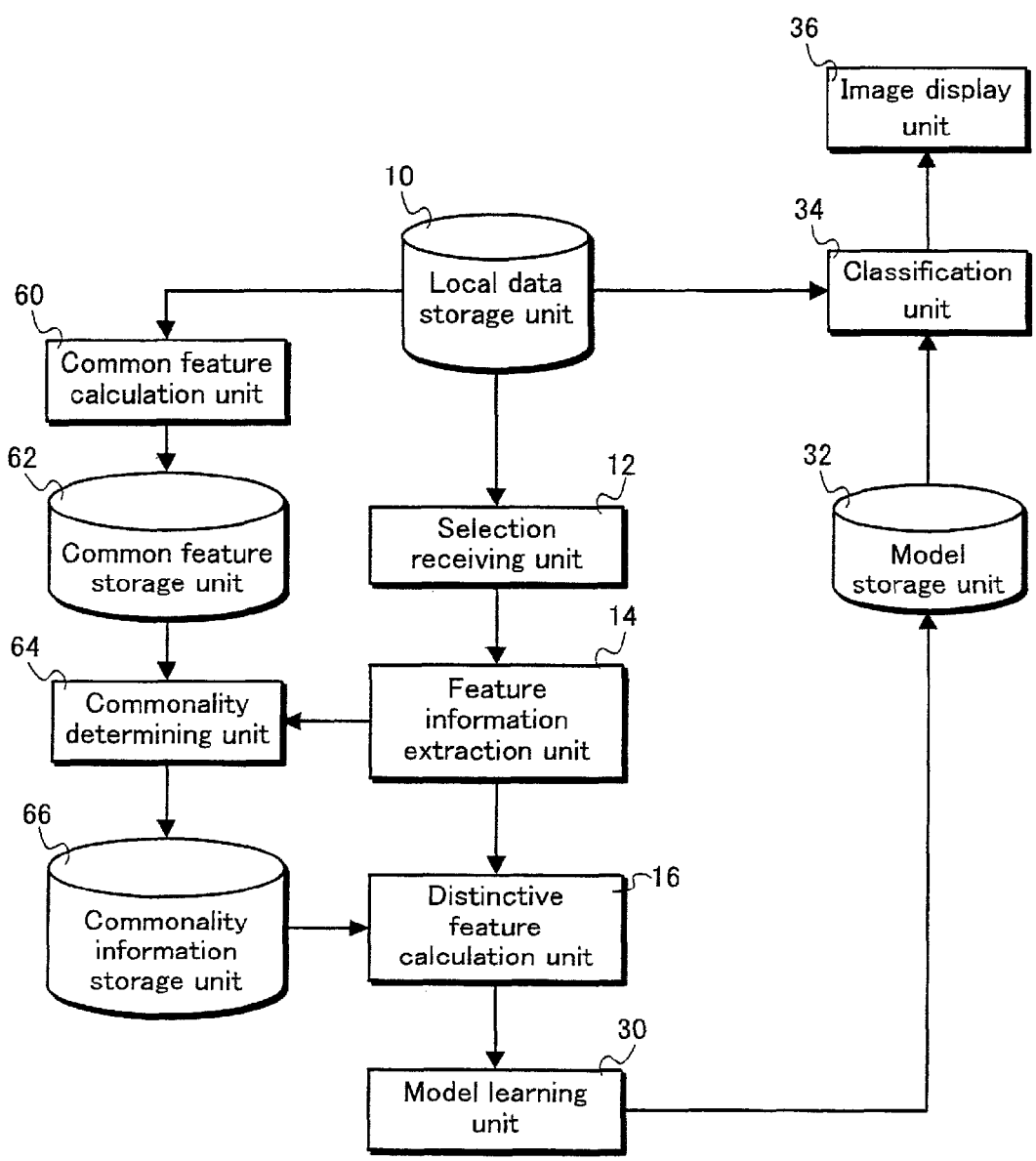
FIG. 12 is a functional block diagram of an image classification apparatus 2 pertaining to embodiment 2.

FIG. 12 is a functional block diagram of an image classification apparatus 2 pertaining to embodiment 2.

A common feature calculation unit 60 obtains a common feature by calculation based on all of or particular images stored in the local data storage unit 10, and stores the result of the calculation in a common feature storage unit 62.

Here, a common feature is commonly (generally) included in images used for calculating the common feature (hereinafter, such images are also referred to as "target images").

Figure 13:
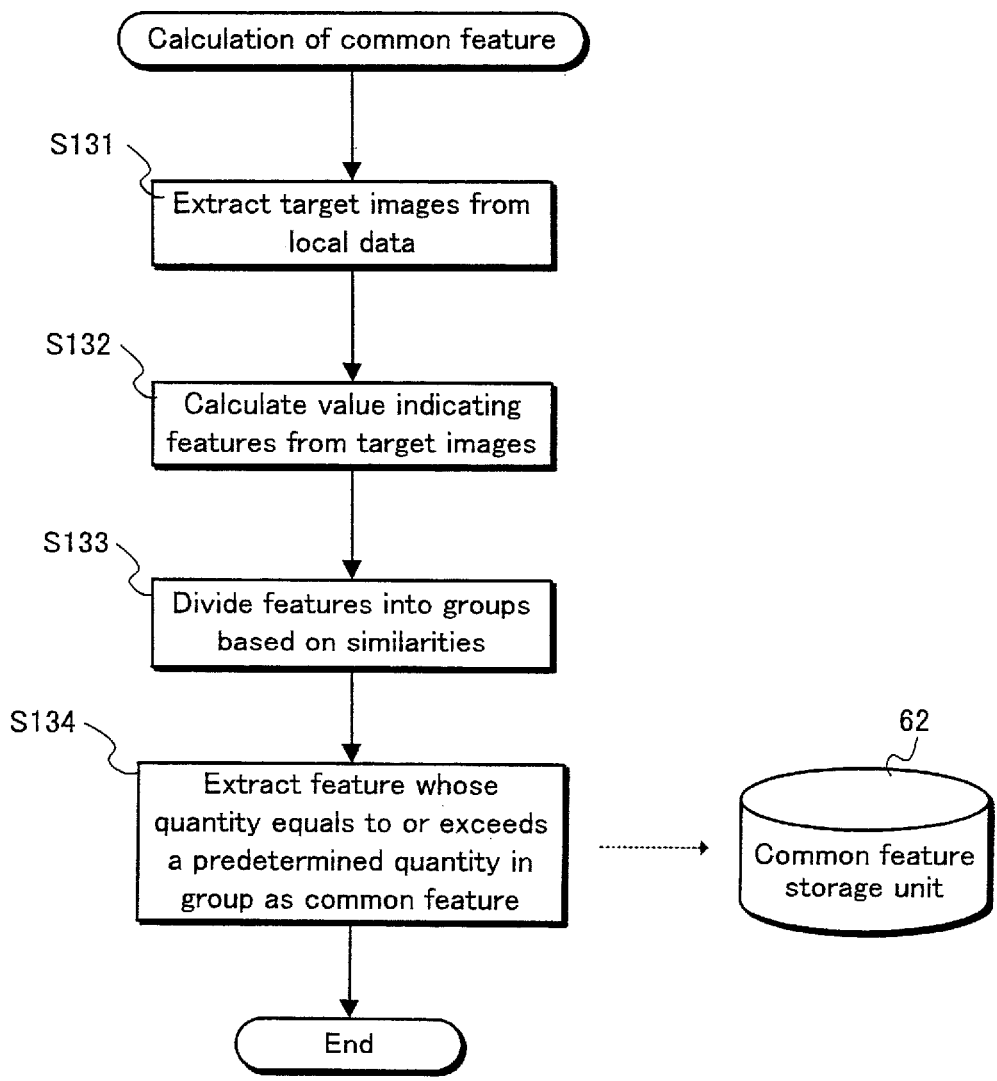
FIG. 13 is a flowchart showing calculation processing for calculating a common feature.

A flow for obtaining a common feature is described with reference to FIG. 13.

First, the common feature calculation unit 60 extracts, from the images stored in the local data storage unit 10, target images from which a value indicating a common feature is to be calculated (step S131).

These target images may be all the images stored in the local data storage unit 10 or may be limited to particular images.

The images are limited according to the following, for example: an event specified by the shooting time (temporal pattern related to the shooting time of images); an event specified by the photography location; and a shooting scene such as indoors or outdoors.

Regarding the event specified by the shooting time, images are limited based on the shooting time per se in units of year/month/week/day/hour/minute, etc., the variety or the number of captured people, the variety or the number of other captured objects, and the units of camera parameters used for photography.

Regarding the event specified by the photography location, images are limited based on geographic information on locations at which the images have been taken, directions in which the images have been taken, and positions at which features appear in the images.

For example, images taken in Tokyo of Japan may be extracted as target images.

Subsequently, the common feature calculation unit 60 calculates values indicating features with use of the target images (step S132).

As a feature, it is possible to use a local feature represented by SIFT or SURF, which indicates a feature of a local area of an image. Note that any value indicating a feature may be used if it is calculated from an image.

Assume that the number of the target images is X and Y features can be obtained from each of the X images on average. In this case, the total number of features is calculated from the equation: $X \times Y = M$. The common feature calculation unit 60 classifies the M features into groups based on similarities thereof (step S133).

As examples for grouping, the M features are classified into P groups by performing M:M matching, performing N:N matching after random sampling for selecting N features, or using clustering methods such as kmeans.

Lastly, when the number of elements of a group constituting the P groups is equal to or greater than a predetermined value, the common feature calculation unit 60 extracts a feature belonging to the group as a common feature, which is commonly included in the target images (step S134).

Assume that the numbers of elements constituting P groups, i.e., $G_1$-$G_p$ are $N_{G1}$-$N_{Gp}$, respectively. In this case, when each of the $N_{G1}$-$N_{Gp}$ is equal to or more than $Thr_3$, a feature belonging to a corresponding one of the $G_1$-$G_p$ is judged to be a common feature. Further, it is also possible to calculate a commonality by assuming that a commonality is higher as the number of the elements constituting a group increases, or by using not only the number of the elements but frequency of features appearing over a predetermined time cycle.

Note that in the case where all of the features are not obtained, a common feature may be obtained as needed, or a common feature may be determined and obtained only when needed.

A commonality determining unit 64 determines commonalities for each selected image received by the image selection receiving unit 12 by comparing features of each selected image with the common feature stored in the common feature storage unit 62. Subsequently, the commonality determining unit stores commonality information in a commonality information storage unit 66. The commonality information indicates the determined commonalities of each selected image.

The commonality is within a range of 0-1, and can be defined in accordance with the degree of match between a feature and the common feature. For example, in the case where a feature never matches the common feature, the commonality is set to 0, while in the case where a feature completely matches the common feature, the commonality is set to 1. It is assumed that the image is more common in the local data as its commonality is closer to 1, and such an image provides low performance for classifying the local data.

Figure 14:
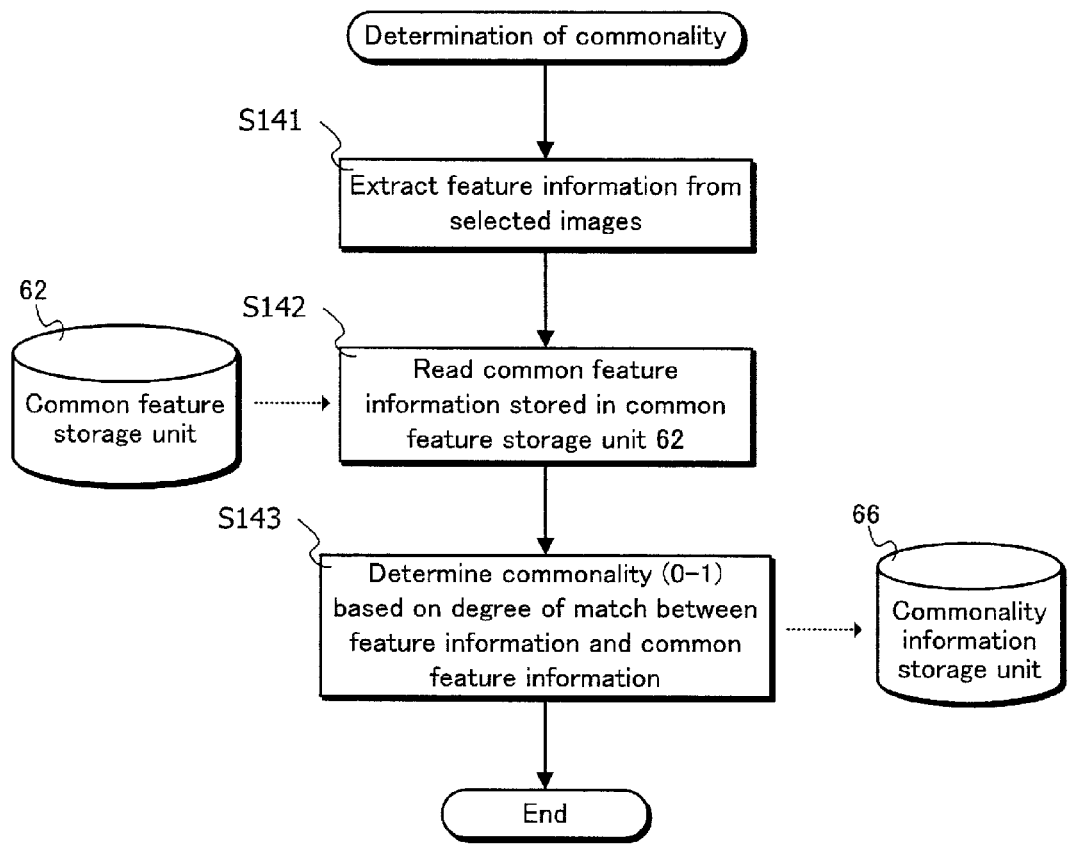
FIG. 14 is a flowchart showing commonality determination processing.

A flow for calculating a commonality is described with reference to FIG. 14.

First, the feature extraction unit 14 extracts feature information from selected images (step S141).

Subsequently, the commonality determining unit 64 reads the common feature information stored in the common feature storage unit 62 (step S142).

Lastly, the commonality determining unit 64 determines commonalities (0-1) based on the degree of match between the feature information extracted in step S141 and the common feature information read in the step S142.

Figure 15:
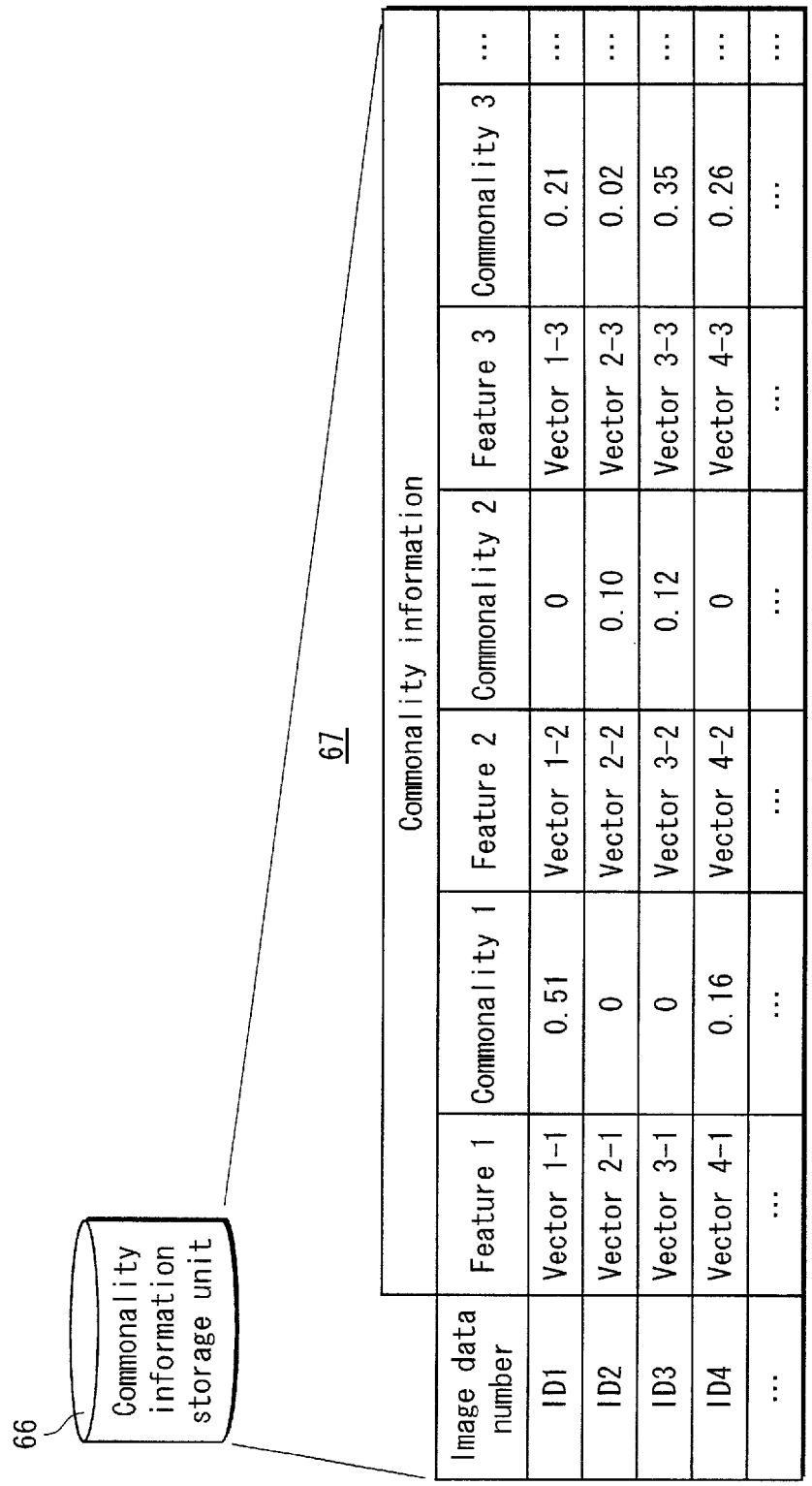
FIG. 15 shows a table showing commonality information.

FIG. 15 shows examples of commonalities determined as above.

A table 67 in FIG. 15 shows commonalities determined by the commonality determining unit 64 for each of selected images, "ID1", "ID2", "ID3" and "ID4".

For each image, features are represented by dimensions such as "feature 1", "feature 2", "feature 3" . . . , and features correspond to respective commonalities.

Such "feature" is obtained by calculation using local features indicated by SIFT, SURF, etc., and simplified to three dimensions in FIG. 15, but the number of dimensions can be greater in practice (for example, SIFT has 128 dimensions). In addition, any type of features may be used if they can be extracted as image analysis information. For example, color information, texture information or edge information of images, or HOG may be used.

According to examples shown in FIG. 15, local future amounts represented as vectors are managed as "feature 1", "feature 2", and "feature 3", and commonalities calculated for respective features are managed as "commonality 1", "commonality 2" and "commonality 3".

Note that for example, a commonality may be defined as follows. When a feature of a selected image and a common feature never match, commonalities of the features may be set to 0, and when a feature of a selected image and a common feature perfectly match, commonalities of the features may be set to 1. In such a case, a commonality of a feature may be obtained by multiplying the degree of match by the commonality of the common feature with the greatest degree of match.

The distinctive feature calculation unit 16 obtains, by calculation, distinctive features of each selected image received by the selection receiving unit 12 in accordance with commonality thereof determined by the commonality determining unit 64.

To be specific, if the first feature has a low commonality, a distinctive feature is obtained after increasing the weight of the first feature, and if the first feature has a high commonality, a distinctive feature is obtained after decreasing the weigh for the first feature.

Weight may be calculated via various methods such as the following methods (1)-(4).

(1) A feature having a commonality equal to or greater than a predetermined threshold value may be excluded before model data is created, i.e., before the matching processing among features.

(2) When incorporating embodiment 1 and weighting features as shown in FIG. 11, the weight of a feature having a high commonality can be decreased by multiplying the weight by {1−(commonality shown in FIG. 15)}.

For example, if a commonality of a feature is high, i.e., 0.9, the weight of the feature can be greatly decreased by multiplying the weight by 1−0.9=0.1.

(3) If it can be judged that the ratio or the quantity of features of images that commonly appear in one event including the images falls in a predetermined range, the ratio or the quantity of the common feature per se can be used as model data.

(4) When creating a statistical model via a conventional machine learning method, a model of a commonality per se can be created by inputting the commonality as a parameter of features, or using images as a learning sample. The learning sample is created by determining, among images having distinctive features obtained by the distinctive feature calculation unit 16, images having features with a high commonality equal to or greater than a predetermined number, and excluding the determined images or decreasing contribution to a model (weight) for the determined images since these images provide low performance for classifying the local data.

As described above, it is possible to more accurately classify, in local data, images including an object that a user wishes to classify by obtaining beforehand a common feature commonly appearing in local data and lowering performance for classification, and excluding such a common feature instead of by creating a model of a target to be registered per se based only on images selected by a user, or by creating a model of frequency of appearance of the common feature.

Embodiment 3

Embodiment 3 relates to an image classification apparatus that, when a user selects images to be classified and creates model data based on the selected images, receives correction operation from the user and updates the model data so as to accurately classify images including a registered target.

That is, when the image classification apparatus displays the result of automatic classification of images including a registered model and the result includes mistakes, a user interface (UI) receives input of correction operation from a user.

The image classification apparatus attempts to improve performance for classifying images by correcting and updating the model data in accordance with the received input.

Note that in the present embodiment 3, components having the same functions as in embodiment 1 are given the same reference signs, and since the description of embodiment 1 applies in embodiment 3 as well, such description is omitted.

Figure 16:
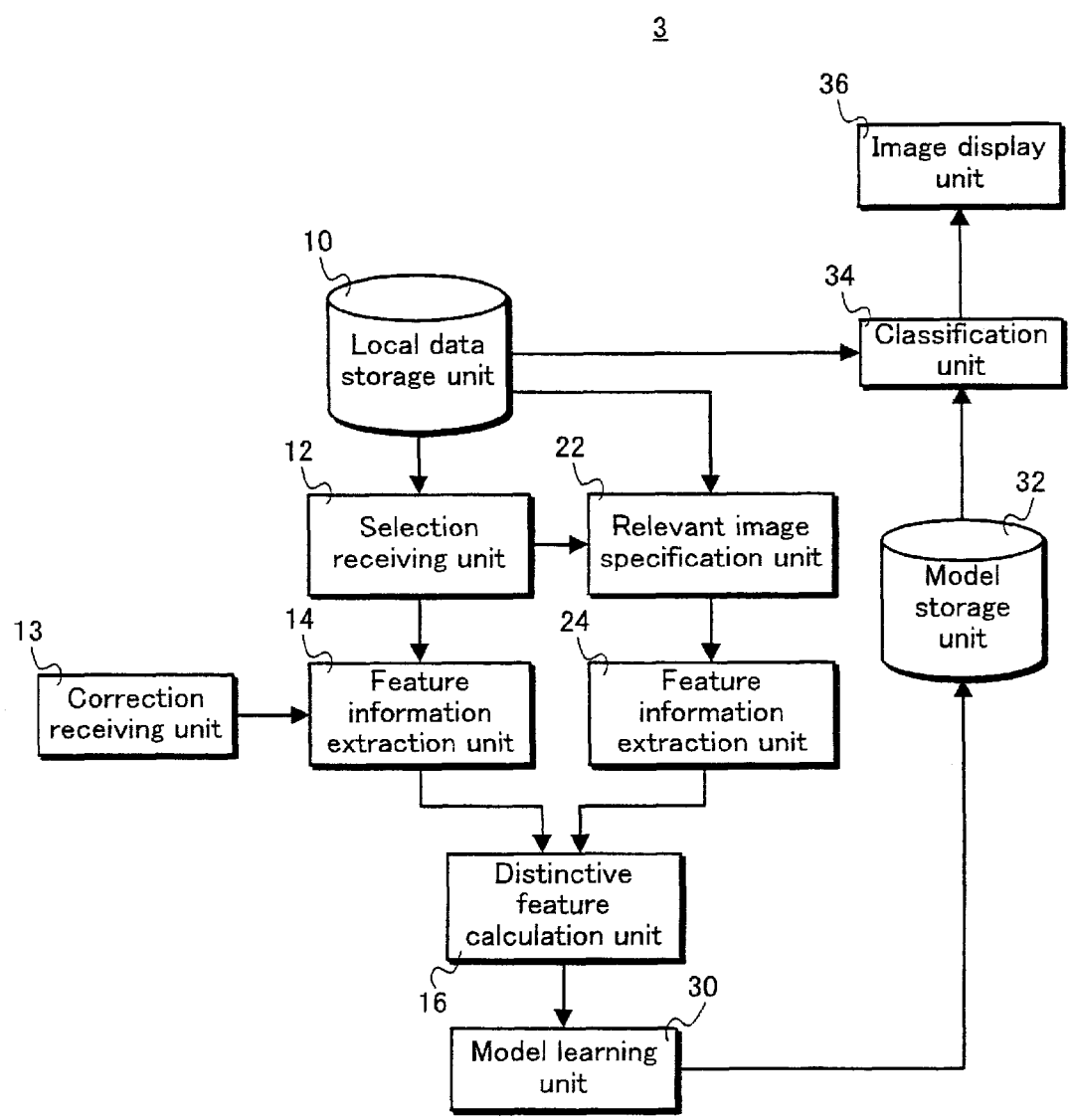
FIG. 16 is a functional block diagram of an image classification apparatus 3 pertaining to embodiment 3.

FIG. 16 is a functional block diagram of an image classification apparatus 3 pertaining to embodiment 3.

A correction receiving unit 13 receives correction via an input device with regard to the result of classification displayed by the image display unit 36. Examples of an input device include a touch screen and a mouse For example, based on the model data of the user's cat named "Tama", the image display unit 36 displays classified images that are supposed to include "Tama", along with a message such as "please select an image that does not match registered model 'Tama'", to encourage the user to perform correction.

The correction receiving unit 13 receives input of correction operation when the user corrects misclassification of the output result displayed by the image display unit 36. For example, a touch panel display or a mouse is used to perform an input operation to select images to be corrected and update the registered model or divide the registered model.

The following describes in detail how to correct and update the model data. The model data is corrected in the case where the image display unit 36 displays images to be corrected when a user classifies or searches for images including the registered model. The model data is updated in the case where a registered model is changed, i.e., classified into a plurality of models, for example.

The following describes how a user selects images that he/she wishes to correct.

Figure 17A:
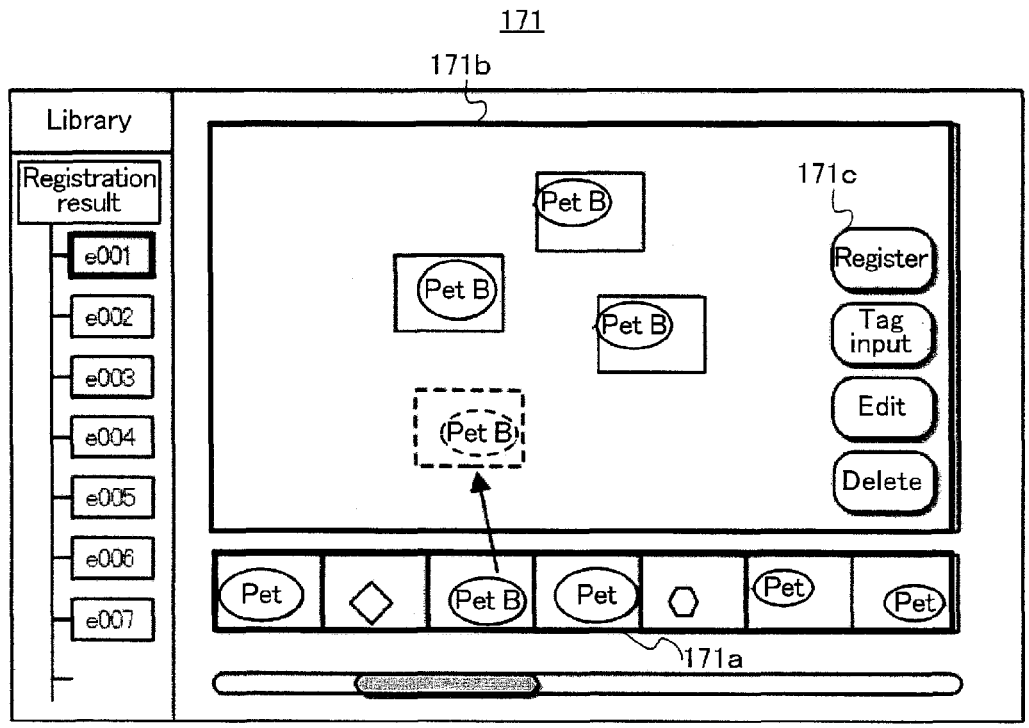
FIGS. 17A-17B show examples of UI screens.
Figure 17B:
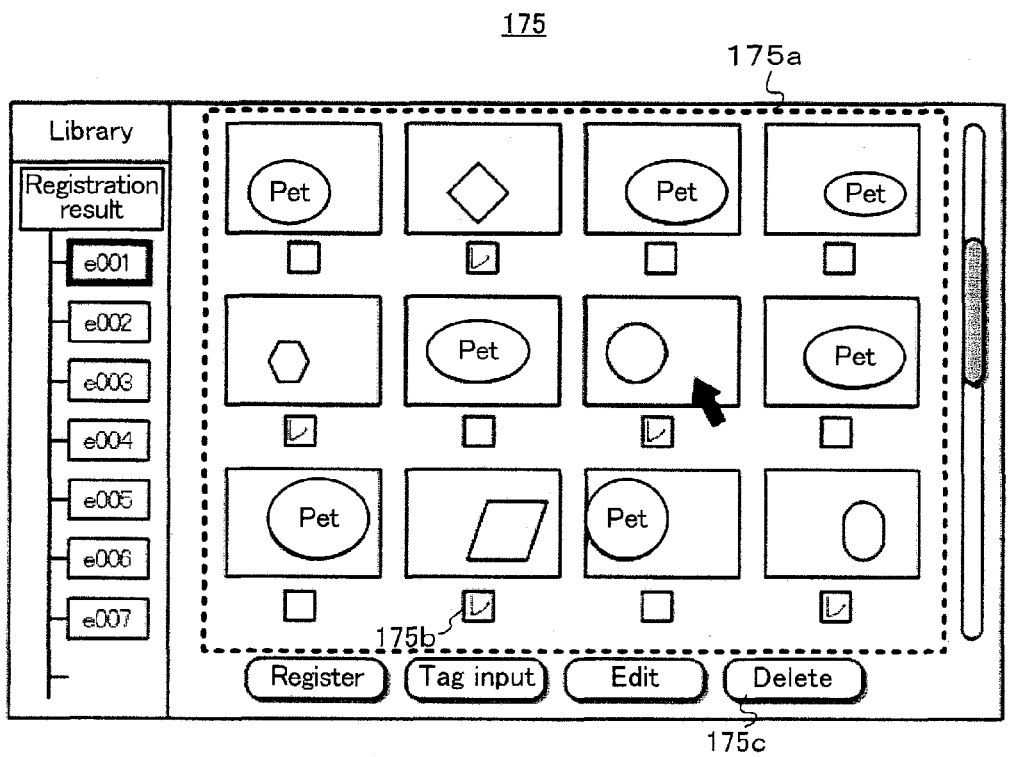

FIGS. 17A and 17B show examples of UI screens pertaining to classification results displayed by the image display unit 36 and correction received by the correction receiving unit 13.

FIG. 17A shows an example in which images classified as a group "e001" includes misclassified images and the misclassified images are corrected via a touch screen 171.

The touch screen 171 displays, in a frame 171a, the images classified as the group "e001".

For example, the images classified as "e001" includes a wide variety of pets (targets to be registered are pets), and a user wishes to create a model with only use of a pet B (for example, the cat "Tama") as a target to be registered.

In this case, correction/update processing starts by clicking a register button 171c after collecting images including the pet B in an upper flame 171b by dragging them while horizontally scrolling the images included in "e001", which are displayed in the flame 171a.

Note that when changing models, a plurality of models can be merged, in addition to dividing a model into a plurality of models. For example, when two models of user's cats named "Tama" and "Mike" have been created, the two models can be merged.

Further, before displaying images in the frame 171a and the like, it is effective to arrange the images according to the degree of match with or similarity to the registered model data, rather than simply according to the shooting time. This is because such rearrangement enables the user to easily correct the images.

FIG. 17B shows an example in which images misclassified as a group "e001" are corrected.

Though the user was intended to create model data of pets by indicating the pets as targets to be registered as models, images including objects other than the pets are included in the frame 175a.

In this case, the user selects the images including the other objects, which are correction targets, with a mouse while scrolling the images in the frame 175a down. When the user clicks a delete button 175c, correction/update processing starts.

In the example of the FIG. 17B, images associated to checked checkboxes 175b have been selected by a user.

The correction/update processing starts after images to be corrected are selected or images including a target to be registered are reselected, and model data is recreated based on those images in the same manner as described in embodiments 1 and 2.

To be specific, pieces of model data information shown in FIG. 11 are corrected. When the images to be corrected are selected, feature information to be enhanced or to be excluded is extracted from the images to be corrected and other images correctly classified, which have not been selected. The model data is corrected/updated according to the extracted information.

Figure 18:
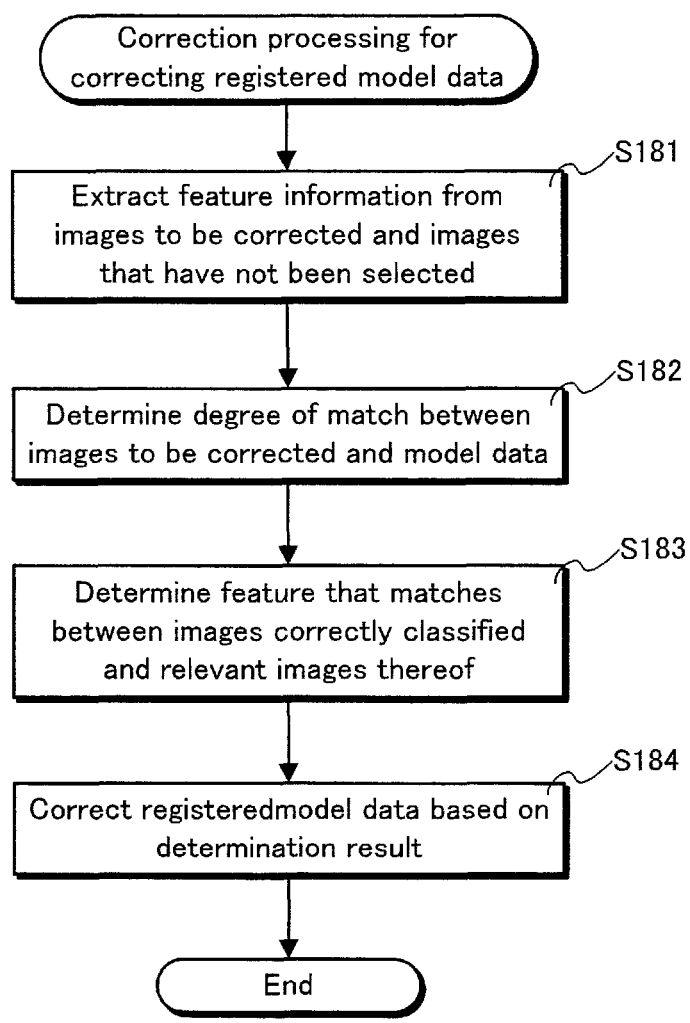
FIG. 18 is a flowchart showing correction processing for correcting registered model data.

FIG. 18 is a flowchart showing correction processing for correcting the registered model data in accordance with the selected images to be corrected.

The following describes the processing on the assumption that misclassified images have been selected as images to be corrected. Conversely, in the case where correctly classified images have been selected, processing opposite to the following description is performed to correct/update model data.

When images to be corrected are selected and correction processing starts, it is likely that unselected images on the screen showing the classification result have been correctly classified.

Therefore, as shown in FIG. 18, the feature information extraction unit 14 extracts feature information from the unselected images, in addition to from the images to be corrected (S181). Here, it is assumed that all the images include information of direct classification tag and automatic classification tag. The direct classification tag is directly given by a user, and the automatic classification tag is automatically given by the image classification apparatus.

In the case where the unselected images do not include the information of direct classification tag, the information of automatic classification of these images is likely to be correct and is useful for correction of the model data. Therefore, these images are used as correct classified images.

Next, the feature information extraction unit 14 determines a part where the degree of match of features between the images to be corrected and the model data is high, based on the extracted feature information (S182).

Determination of similarities of features is assumed to be performed in the same manner as above. Further, it is also possible to determine and utilize distinctive features of the images to be corrected by determining distinctive features of the images to be corrected and their respective relevant images in the same manner as step S26 (FIG. 7) pertaining to embodiment 1.

Then using the feature information of the correctly classified images extracted in step S181, features that match between these images and relevant images thereof are determined (S183) in the same manner as step S26 (FIG. 7) pertaining to embodiment 1.

Lastly, the model learning unit 30 corrects/updates the model data of the registered object (S184) with use of the result of determination performed in steps S182 and S183.

The features of the images to be corrected, which have been determined as the result of step S182, are to be deleted from the model data. Accordingly, the higher the degree of match between these images and the model data or distinctiveness of the distinctive features of these images is, the more such features should be deleted from the model data.

When matching processing is performed among features, it is conceivable to delete a feature that matches the model data or decrease the weight for the feature at a certain rate. When creating a statistical model via a conventional machine learning method, it is possible to recreate a model by decreasing the weight of the feature, in addition to simply adding the feature as a negative sample. On the other hand, a feature determined as the result of step S183 is likely to be useful to classify the target to be registered, and accordingly, the matched feature is learned as a positive sample.

In the case of the matching processing among features is performed, it is possible to improve classification performance of the model in the local data by increasing the weight of a feature that matches the model data at a certain ratio, or newly adding a distinctive feature that is not included in the model data.

When creating a statistical model via a conventional machine learning method, the same processing as processing in step S27 (FIG. 2) pertaining to embodiment 1 can be performed with use of more learning samples. Further, it is also possible to learn after performing weighting on reliability of the samples per se with use of weighted features of each image or similarity to the classification model.

As described above, when a user corrects/updates the results of automatic classification of images including a registered object, a model can be recreated by correcting/updating the model data with use of information extracted from images to be corrected and images that have not been selected. This enables the user to easily correct/register, as needed, an object that the user wishes to classify and allows for an increase in the degree of freedom in registering an object. As a result, the user can easily find images including the registered object.

<Supplementary Explanation 1>

Although the embodiments have been described above, the present invention is not limited thereto. Other embodiments and variations achieving the aim of the present invention and aims related thereto are also possible, such as the following.

(1) Although not particularly mentioned in detail in embodiment 1, the distinctive feature calculation unit 16 may compare color distribution between the selected images and the relevant images, and may exclude an area defined in the relevant images whose color distribution does not match the color distribution of areas defined in the selected images from a target from which a distinctive feature is obtained.

For example, as shown in FIG. 19, suppose that a selected image "ID3" and a relevant image "ID4" each show a yellow bottle. Both images contain initials of simple colors that represent color histograms. In the relevant image "ID4", only areas 183 and 184 are black. When the relevant image "ID4" thus includes an area whose color is not contained in the selected image "ID3", it may be possible to exclude local features of the black areas defined in the relevant image "ID4" from a target from which a distinctive feature is obtained.

Figure 20:
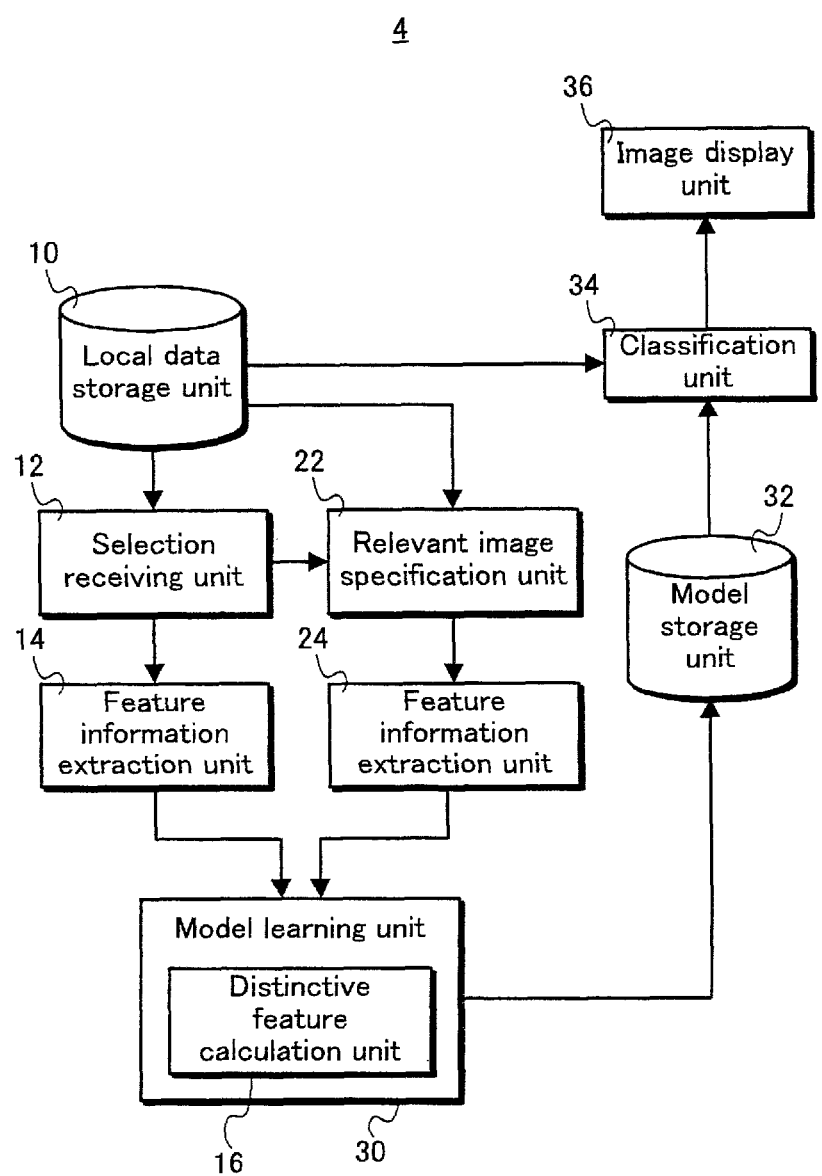
FIG. 20 is a functional block diagram of an image classification apparatus 4.

(2) Though each embodiment has explained the distinctive feature calculation unit 16 and the model learning unit 30 as different blocks, these unit may be integrated so that the model learning unit 30 includes a function of the distinctive feature calculation unit 16 (see image classification apparatus 4 in FIG. 20).

Figure 21:
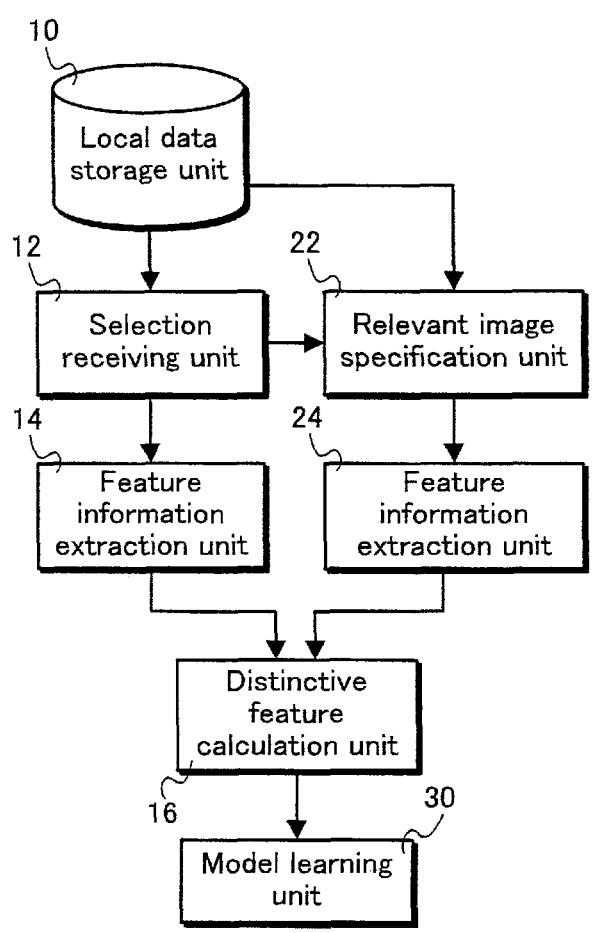
FIG. 21 is a functional block diagram of a model creation apparatus 5.

(3) Although each embodiment has explained that one image classification apparatus performs processing from creation of model data to classification of images, two apparatuses may be used, and one apparatus may create model data and the other may classify images. For example, a model creation apparatus 5 shown in FIG. 21 may create model data, and images may be classified by another apparatus.

(4) Although embodiment 1 has explained that model data of entirety of the object to be registered is basically created in units of images, a model of a part of the object in the images may be created and registered.

For example, in the case where images show an entire image of a dog, if a combination of its ears and eyes or a combination of its legs and tail frequently appear in the selected images, it is conceivable that a model of a subset of features only including the ears and eyes or the legs and tail may be created, instead of a model of all the features of the dog.

In the case of FIG. 11, for example, a model created from a subset of features 1, 3 and 5 may be useful for classification, instead of a set of feature 1-feature 10.

(5) It may be conceived to distribute a control program composed of program code for causing processors of various information processing apparatuses and various circuits connected thereto to execute the operations as description has been made in the embodiment. The distribution of such control program may be realized by recording the control program onto recording media, or transmitting the control program via various communication paths.

The recording media which may be used in the distribution of the control program include such non-transitory recording media as IC cards, hard disks, optical discs, flexible disks, ROMs and the like.

The distributed control program is to be stored to a processor-readable memory or the like, and accessed by the processor. Thus, each of the functions described in the embodiments is realized.

(6) Each image classification apparatuses according to the above embodiments may be distinctively realized as an LSI (Large Scale Integration), which is a type of an integrated circuit. Further, each of the functions may be separately integrated into a single chip, or the functions may be integrated into a single chip including a part or all of the functions. For example, a tuner 3 may be integrated into one integrated circuit along with other circuit units or integrated into an integrated circuit other than the other circuit units.

Although description has been made on the basis of an LSI in the above, the name of the integrated circuit may differ according to the degree of integration of the chips. Other integrated circuits include an IC (integrated circuit), a system LSI, a super LSI, and an ultra LSI.

Further, the method applied for forming integrated circuits is not limited to the LSI, and the present invention may be realized on a dedicated circuit or a general purpose processor. The present invention may be realized on a FPGA (Field Programmable Gate Array) being an LSI which can be programmed after manufacturing, or a reconfigurable processor being a LSI reconfiguration of which could be made to the connection of internal circuit cells and settings.

In addition, if a new technology of circuit integration replacing that of the LSI emerges as a result of the progress made in the field of semiconductor technology or technology deriving therefrom, the integration of function blocks may be performed applying such technology. At this point, there is a possibility of biotechnology being applied to induce the future development of circuit integration technology.

(7) Although an example shown in FIG. 9 has been explained by illustrating point-based features indicated by SIFT, etc., it is also possible to perform robust detection with use of features in units of areas (plain-based features) constituting an image.

That is, the feature information extraction unit 14 (see FIG. 1) divides one selected image into a plurality of areas, and obtains a feature (for example, a color histogram) for each area.

In a similar way, the feature information extraction unit 24 divides each relevant image into a plurality of areas, and obtains a feature for each area.

The details of a method for dividing (segmenting) an image into a plurality of areas are described in the following literatures, for example:

"Superpixel: Empirical Studies and Applications", (http://www.cs.washington.edu/homes/xren/research/superpixel, http://www.stat.ucla.edu/~yuille/courses/canton/day5/day5examples/Superpixels.pdf), and Pedro F. Felzenszwalb and Daniel P. Huttenlocher: "Efficient Graph-Based Image Segmentation", International Journal of Computer Vision, Volume 59, Number 2, September 2004 (http://people.cs.uchicago.edu/~pff/segment/, http://people.cs.uchicago.edu/~pff/papers/seg-ijcv.pdf).

The distinctive feature calculation unit 16 obtained a distinctive feature of one selected image by repeating comparing a feature of each area of the one selected image and a feature of each area of one relevant image.

FIG. 22 shows an image of processing with use of such plain-based features. In FIG. 22, the feature information extraction unit 14 segments a selected image (ID3) into five areas, and the feature information extraction unit 24 segments each of two relevant images (ID2 and ID4) into six areas.

The distinctive feature calculation unit 16 compares each of values indicating features of the five areas of the selected image (ID3) with each of values indicating features of the six areas of one of the relevant image (ID2), and calculates values indicating the results of the comparison ($a_{1,1}, a_{1,2}, a_{1,3}, a_{1,4}, a_{1,5}, a_{1,6}, a^2_{1,1}, a^2_{1,2}, a^2_{1,3}, a^2_{1,4}, a^2_{1,5}, a^2_{1,6}, \ldots$). In a similar way, the distinctive feature calculation unit 16 compares each of values indicating features of the five areas of the selected image (ID3) with each of values indicating features of the six areas of the other of the relevant image (ID4), and calculates values indicating the results of the comparison ($b_{1,1}, b_{1,2}, b_{1,3}, b_{1,4}, b_{1,5}, b_{1,6}, b^2_{1,1}, b^2_{1,2}, b^2_{1,3}, B^2_{1,4}, b^2_{1,5}, b^2_{1,6}, \ldots$). The distinctive feature calculation unit 16 obtains a distinctive feature of the selected image by using the calculated values in methods described in the embodiments.

Note that in the example shown in FIG. 22, one image (selected image or relevant image) is segmented into areas in one manner, but comparison of features may be performed through multiple stages by setting multiple stages of parameters (for example, scale) used for segmentation. Further, point-based features and plain-based features may be combined.

(8) The embodiments have explained that when the matching point is found at the center of the image, the distinctive feature calculation unit 16 learns a feature of the matching point as a positive sample, and when the matching point is found at the periphery of the image, the distinctive feature calculation unit 16 learns a feature of the matching point as a negative sample (see steps S72 and S73 in FIG. 7, and FIG. 8), but the embodiments are not limited thereto. The distinctive feature calculation unit 16 may determine an area from which a positive sample/negative sample is obtained with use of metadata of an image.

In an example shown in FIG. 23A, with use of information of focused area included in metadata of an image A, a focused area 231 of the image A is determined as an area from which a positive sample is obtained, and the other area is determined as an area from which a negative sample is obtained.

In an example shown in FIG. 23B, with use of information of depth-of-field included in metadata of an image B, an in-focus area 232 of the image B is determined as an area from which a positive sample is obtained, and the other area is determined as an area from which a negative sample is obtained. Note that examples of the information of depth-of-field include an aperture value, a focal length, and a shooting distance (distance between an object and a camera). When a photographic apparatus is a 3D camera, it is also conceived that depth-of-field is calculated, in units of pixels, based on parallax between a left-eye image and a right-eye image.

According to an example shown in FIG. 23C, in an image C, which is a zoomed-in image of an image X, an area 233 of the image C whose center is the center of zoom-in is determined as an area from which a positive sample is obtained, and the other area is determined as an area from which a negative sample is obtained. This is because it is assumed that a photographer has focused on the center of zoom-in.

Note that if there are information indicating whether zoom-in has been performed or information of the center of zoom-in as metadata of the image C, such information may be used for judgment of zoom-in or determination of the center, for example. Further, zoom-in may be judged by comparing a digital zoom ratio included in metadata of the image C with a digital zoom ratio included in metadata of the image X (whose shooting time is immediately before the image C).

According to an example shown in FIG. 23D, in an image D, which is a zoomed-out image of an image Y, an area 234 of the image D whose center is the center of zoom-out is determined as an area from which a negative sample is obtained, and the other area is determined as an area 235 from which a positive sample is obtained. This is because it is assumed that a photographer has focused on a surrounding area of an area that have been seen. Note that whether zoom-out has been performed can be judged in the same method as zoom-in, and the center of zoom-out can be determined in the same method as zoom-in.

Figure 24:
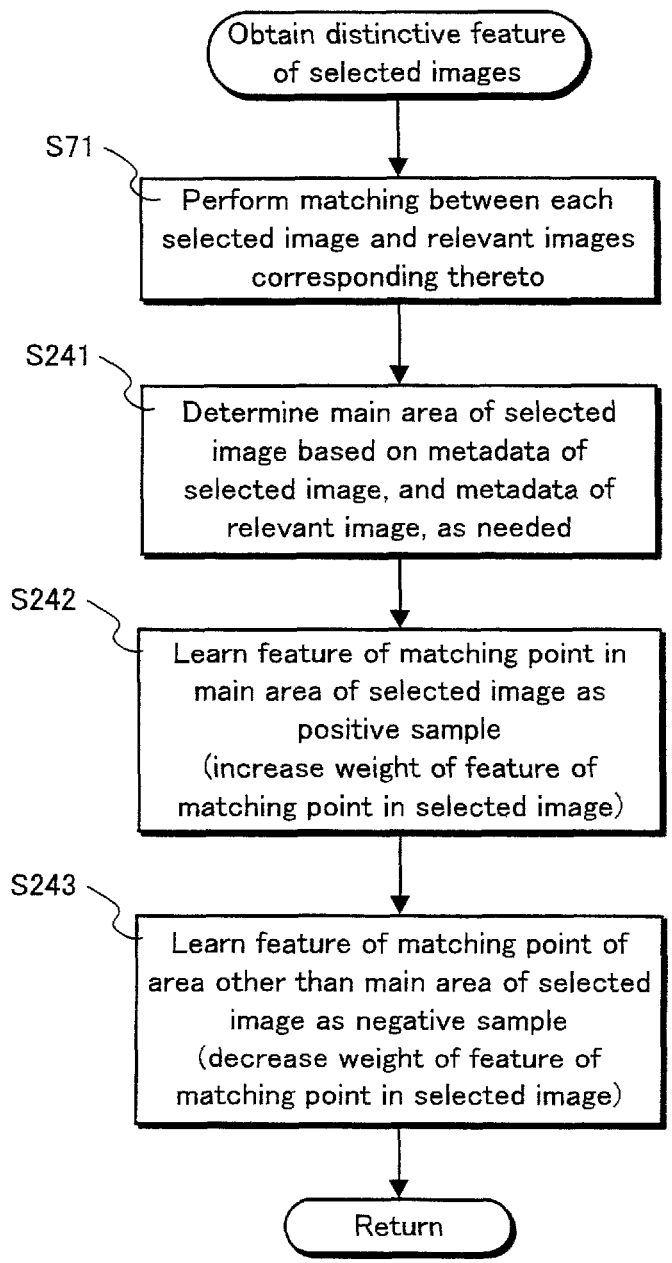
FIG. 24 is a flowchart showing details of processing for calculating a distinctive feature of a selected image.

The following describes a flow of processing that is performed by the distinctive feature calculation unit 16 when using an area from which a positive sample is obtained (main area), with reference to FIG. 24.

Figure 7:
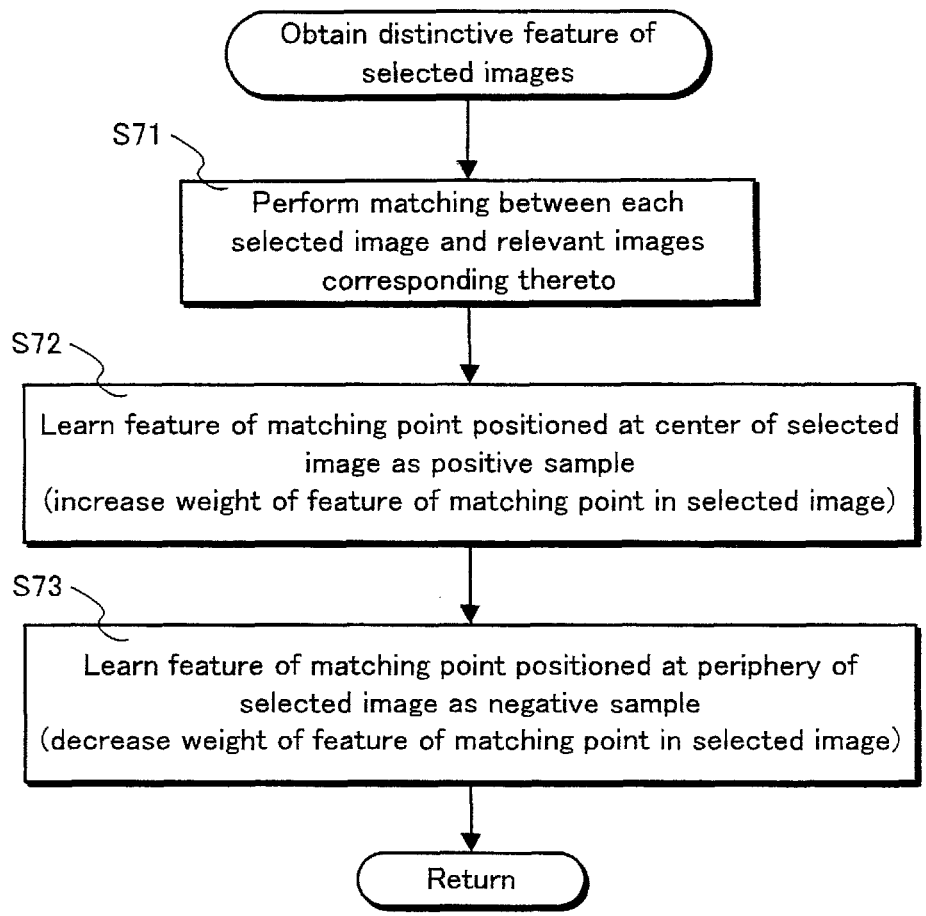
FIG. 7 is a flowchart showing details of processing for calculating a distinctive feature of a selected image.

After matching processing performed in the same manner as in FIG. 7 (S71), the distinctive feature calculation unit 16 determines a main area of a selected image based on metadata of the selected image and on metadata of relevant images, as needed (S241).

When the matching area is found in the main area, the distinctive feature calculation unit 16 learns a feature of the matching point as a positive sample (S242), and when the matching area is found in an area other than the main area, learns, the distinctive feature calculation unit 16 learns a feature of the matching point as a negative sample (S243).

As described above, by determining areas from which a positive/negative sample is obtained based on metadata of images, it is possible to acquire a result that matches the photographer's intention.

(9) The image classification using model data, which has been described in the embodiments, can be provided as a cloud-based service in which a plurality of apparatuses cooperate with one another.

Figure 25:
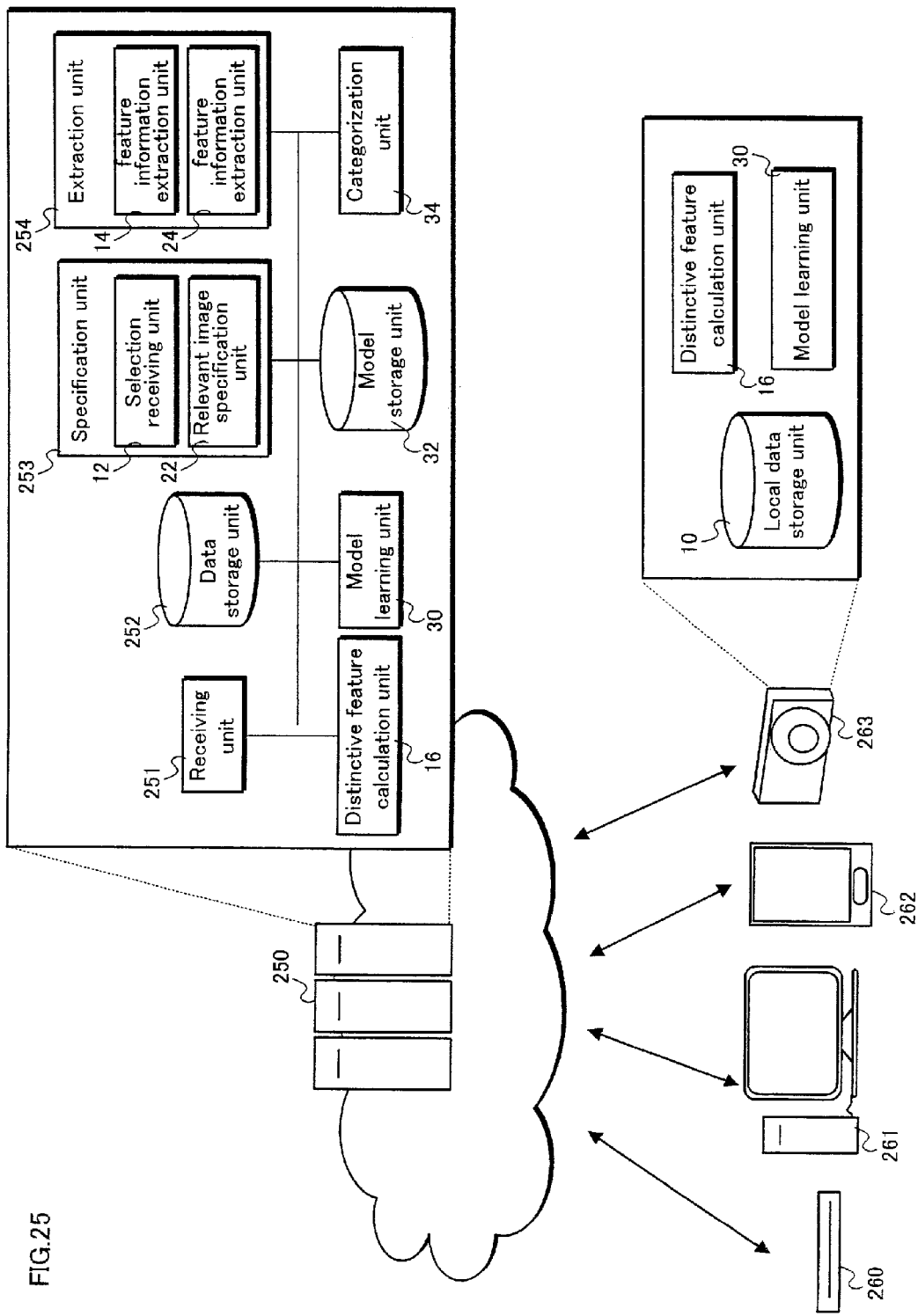

In an example shown in FIG. 25, a cloud-based server 250 can receive/transmit data with a user apparatus such as an AV apparatus 260, a personal computer 261, a portable device 262 and a digital camera 263 via network. The cloud-based server 250 creates model data and classifies images by receiving the data from such a user apparatus.

The cloud-based server 250 includes functional blocks that are basically the same as those of the image classification apparatus 1 (see FIG. 1). The cloud-based server 250 differs from the image classification apparatus 1 as follows. The cloud-based server 250 includes a receiving unit 251, a data storage unit 252, a selection receiving unit 12, a relevant image specification unit 22, a specification unit 253, a feature information extraction unit 14, a feature information extraction unit 16, and a extraction unit 254. The receiving unit 251 receives data such as images from a user apparatus. The data storage unit 252 stores therein the data such as images. The specification unit 253 specifies selected images and relevant images. The extraction unit 254 extracts features from the selected images and the relevant images.

The server 250 may perform all of the main processing described in the embodiments, but it is possible to share the processing with other apparatuses. Some variations are conceivable in view of the following. Here, the digital camera 263 is taken as an example of a user apparatus.

In view of the load of operations, the digital camera 263 is inappropriate for high-speed operations compared with the server 250. However, a relevantly light operational load may be imposed on the digital camera 263. For example, the digital camera 263 may perform processing with a light operational load regarding extraction of feature information, and the server 250 may perform processing with a heavy load.

In view of the storage capacity and usage, it is conceivable that the storage capacity of the digital camera 263 is smaller than that of the server 250 (the opposite is possible as well). Therefore, it is conceivable that data whose size is likely to be large (for example, original data of images) is stored in the server 250, and data whose size is likely to be small (for example, thumbnails of images or model data) is stored in the digital camera 263. Further, it is also possible that data that will be frequently used by the digital camera 263 is stored in the digital camera per se.

In view of bandwidth, a network speed between the digital camera 263 and the server 250 might be sometimes insufficient. Accordingly, when the digital camera 263 transmits image data to the server 250, the digital camera 263 may decrease the size of images beforehand by decreasing resolution of the images or deleting metadata that is unlikely to be used.

<Supplementary Explanation 2>

The following describes various aspects of the present invention.

(1) An image classification apparatus for classifying images with use of model data, comprises: a receiving unit configured to receive images selected by a user from among a plurality of accumulated images; a first extraction unit configured to extract first features from each of the received images; a specification unit configured to specify, from among the accumulated images, a relevant image for each received image; a second extraction unit configured to extract second features from each of the specified relevant images; a calculation unit configured to obtain a third feature by calculation using locality of the extracted first and second features, the third feature being distinctive of a subject of the received images; and a model creation unit configured to create model data based on the third feature.

(2) For each of the received images, the calculation may be performed by matching between the first features and the second features.

(3) The first features extracted by the first extraction unit may be features of respective areas defined in each received image, and the second features extracted by the second extraction unit may be features of respective areas defined in each relevant image.

(4) In the matching for obtaining the third feature, when detecting a matching point in a central area of each received image, the calculation unit may increase weight of a first feature of the matching point of each received image, and when detecting a matching point in an area of each received image other than the central area, the calculation unit may decrease weight of a first feature of the matching point of each received image, the matching point being a point at which a first feature matches a second feature.

(5) The locality of the first features and the second features may indicate at least one of a keypoint descriptor, an edge feature, and information indicating specific object recognition.

(6) The calculation unit may determine a main area for each received image based on metadata attached thereto and on metadata attached to the corresponding relevant image, and in the matching for obtaining the third feature, when detecting a matching point in the main area, the calculation unit may increase weight of a first feature of the matching point of each received image, and when detecting a matching point in an area of each received image other than the main area, the calculation unit may decrease weight of a first feature of the matching point of each received image, the matching point being a point at which a first feature matches a second feature.

(7) The locality of the features is represented by a color histogram, and the calculation unit may compare color distribution of the areas defined in each received image and color distribution of the areas defined in the corresponding relevant image before the matching, and may exclude a second feature corresponding to a mismatching area from the matching, the mismatching area being an area of the corresponding relevant image whose color distribution does not match the color distribution of an area defined in each received image.

(8) The first extraction unit and the second extraction unit may divide each of the received and the relevant images into a plurality of segments before the extraction, and may extract a first feature and a second feature from each of the divided segments, respectively, and the calculation unit may perform the matching in units of the divided segments.

(9) The specification unit may specify, for each received image, an image belonging to the same event as each received image as the relevant image.

(10) The specification unit may specify, for each received image, an image belonging to the same pattern of photography as each received image as the relevant image.

(11) The image classification apparatus may further comprise: a computing unit configured to compute, based on all features of the accumulated images, a value indicating a common feature; and a determination unit configured to determine, with use of the computed value, a level of commonality of each of the first features extracted by the first extraction unit, wherein the calculation unit may obtain the third feature by increasing weight of a first feature whose commonality is low, and decreasing weight of a first feature whose commonality is high.

(12) The computing unit may classify, with use of a classifier, said all features into groups each having certain similarity, and may determine, as the common feature, a feature whose quantity is equal to or greater than a predetermined quantity or whose frequency of appearance is equal to or greater than predetermined frequency in each group.

(13) The computing unit may classify said all features of the accumulated images into groups in units of events, each image belonging to an event, and may compute the value indicating the common feature with use of a feature whose quantity is equal to or greater than a predetermined quantity or whose frequency of appearance is equal to or greater than predetermined frequency in each group.

(14) The events may be defined based on at least one of time intervals of photography, frequency of photography within a specific time period, the number of people appearing in images taken within a specific time period, the number of objects appearing in images taken within a specific time period, a variety of people appearing in images taken within a specific period, and frequency of objects appearing in images taken within a specific time period, or at least one of camera parameters during photography, geometrical information of photography locations, transition information, compositional information of images, and information of locations at which features appear in images.

(15) The image classification apparatus may further comprise: a classification unit configured to classify the accumulated images by judging whether each of the accumulated images matches the created model data; a display unit configured to display an identifier of the model data and images that match the model data; and a correction receiving unit configured to receive correction information relating to correction of the model data from displayed images, wherein the model creation unit may update the created model data based on the correction information received by the correction receiving unit.

(16) An image classification method for classifying images with use of model data, comprises the steps of: receiving images selected by a user from among a plurality of accumulated images; extracting first features from each of the received images; specifying, from among the accumulated images, a relevant image for each received image; extracting second features from each of the specified relevant images; obtaining a third feature by calculation using locality of the extracted first and second features, the third feature being distinctive of a subject of the received images; and creating model data based on the third feature.

(17) A program for causing an image classification apparatus to perform image classification processing, the image classification processing comprises the steps of: receiving images selected by a user from among a plurality of accumulated images; extracting first features from each of the received images; specifying, from among the accumulated images, a relevant image for each received image; extracting second features from each of the specified relevant images; obtaining a third feature by calculation using locality of the extracted first and second features, the third feature being distinctive of a subject of the received images; and creating model data based on the third feature.

(18) A recording medium recording thereon a program for causing an image classification apparatus to perform image classification processing, the image classification processing comprises the steps of: receiving images selected by a user from among a plurality of accumulated images; extracting first features from each of the received images; specifying, from among the accumulated images, a relevant image for each received image; extracting second features from each of the specified relevant images; obtaining a third feature by calculation using locality of the extracted first and second features, the third feature being distinctive of a subject of the received images; and creating model data based on the third feature.

(19) An integrated circuit for classifying images with use of model data, comprises:

a receiving unit configured to receive images selected by a user from among a plurality of accumulated images; a first extraction unit configured to extract first features from each of the received images; a specification unit configured to specify, from among the accumulated images, a relevant image for each received image; a second extraction unit configured to extract second features from each of the specified relevant images; a calculation unit configured to obtain a third feature by calculation using locality of the extracted first and second features, the third feature being distinctive of a subject of the received images; and a model creation unit configured to create model data based on the third feature.

(20) A model creation apparatus, comprises: a receiving unit configured to receive images selected by a user from among a plurality of accumulated images; a first extraction unit configured to extract first features from each of the received images; a specification unit configured to specify, from among the accumulated images, a relevant image for each received image; a second extraction unit configured to extract second features from each of the specified relevant images; a calculation unit configured to obtain a third feature by calculation using locality of the extracted first and second features, the third feature being distinctive of a subject of the received images; and a model creation unit configured to create model data based on the third feature.

(21) An image classification method for classifying images with use of model data on a cloud-based server, comprises: receiving images selected by a user from among a plurality of accumulated images; extracting first features from each of the received images; specifying, from among the accumulated images, a relevant image for each received image; extracting second features from each of the specified relevant images; obtaining a third feature by calculation using locality of the extracted first and second features, the third feature being distinctive of a subject of the received images; and creating model data based on the third feature.

INDUSTRIAL APPLICABILITY

The image classification apparatus pertaining to the embodiments can, even when the number of images selected by a user including a target to be registered is small, improve classification performance of model data within local data by extracting information relevant to the images from user's local data and determining a common feature within the local data. Therefore, the image classification apparatus can easily register an object that he/she likes and effectively extract images including the registered object. That is, it is possible to create model data with high classification performance within the local data with few operations and accurately extract images including an object that he/she likes. Therefore, the image classification apparatus enables the user to effectively handle desired images.

For example, when organizing or searching for images, the user can easily register an object that he/she likes and automatically extract images including the object with an appropriate accuracy thereby efficiently extracting images including the object. Therefore, such an image classification apparatus is useful for various image processing terminals. Also, the image classification apparatus is applicable to a DVD recorder, a TV, a data server, or the like. Furthermore, the image classification apparatus can be provided as software for classifying images.

REFERENCE SIGNS LIST 1, 2, 3, 4 image classification apparatus
5 model creation apparatus
10 local data storage unit
12 selection receiving unit
13 correction receiving unit
14 feature information extraction unit (first extraction unit)
16 distinctive feature calculation unit
22 relevant image specification unit
24 feature information extraction unit (second extraction unit)
30 model learning unit
32 model storage unit
34 classification unit
36 image display unit
250 server

The invention claimed is:
1. An image classification apparatus for classifying images with use of model data, the image classification apparatus comprising:

a processor; and
a non-transitory memory having stored thereon executable instructions, which when executed by the processor, cause the processor to function as:
> a receiving unit configured to receive images selected by a user from among a plurality of accumulated images;
> a first extraction unit configured to extract first features from each of the received images;
> a specification unit configured to specify, from among the accumulated images, a relevant image for each received image;
> a second extraction unit configured to extract second features from each of the specified relevant images;
> a calculation unit configured to obtain a third feature by calculation using locality of the extracted first and second features, the third feature being distinctive of a subject of the received images; and
> a model creation unit configured to create model data based on the third feature, wherein for each of the received images, the calculation is performed by matching between the first features and the second features, the first features extracted by the first extraction unit are features of respective areas defined in each received image, and the second features extracted by the second extraction unit are features of respective areas defined in each relevant image, in the matching for obtaining the third feature,
> when detecting a matching point in a central area of each received image, the calculation unit increases weight of a first feature of the matching point of each received image, and
> when detecting a matching point in an area of each received image other than the central area, the calculation unit decreases weight of a first feature of the matching point of each received image, the matching point being a point at which a first feature matches a second feature.

2. The image classification apparatus of claim 1, wherein the locality of the first features and the second features indicates at least one of a keypoint descriptor, an edge feature, and information indicating specific object recognition.

3. The image classification apparatus of claim 1, wherein the first extraction unit and the second extraction unit divide each of the received and the relevant images into a plurality of segments before the extraction, and extract a first feature and a second feature from each of the divided segments, respectively, and
the calculation unit performs the matching in units of the divided segments.

4. The image classification apparatus of claim 1, wherein the specification unit specifies, for each received image, an image belonging to the same event as each received image as the relevant image.

5. The image classification apparatus of claim 1, wherein the specification unit specifies, for each received image, an image belonging to the same pattern of photography as each received image as the relevant image.

6. An image classification apparatus for classifying images with use of model data, the image classification apparatus comprising:
a processor; and
a non-transitory memory having stored thereon executable instructions, which when executed by the processor, cause the processor to function as:
> a receiving unit configured to receive images selected by a user from among a plurality of accumulated images;
> a first extraction unit configured to extract first features from each of the received images;
> a specification unit configured to specify, from among the accumulated images, a relevant image for each received image;
> a second extraction unit configured to extract second features from each of the specified relevant images;
> a calculation unit configured to obtain a third feature by calculation using locality of the extracted first and second features, the third feature being distinctive of a subject of the received images; and
> a model creation unit configured to create model data based on the third feature, wherein for each of the received images, the calculation is performed by matching between the first features and the second features, the first features extracted by the first extraction unit are features of respective areas defined in each received image, and the second features extracted by the second extraction unit are features of respective areas defined in each relevant image, the calculation unit determines a main area for each received image based on metadata attached thereto and on metadata attached to the corresponding relevant image, and in the matching for obtaining the third feature,
> when detecting a matching point in the main area, the calculation unit increases weight of a first feature of the matching point of each received image, and
> when detecting a matching point in an area of each received image other than the main area, the calculation unit decreases weight of a first feature of the matching point of each received image, the matching point being a point at which a first feature matches a second feature.

7. An image classification apparatus for classifying images with use of model data, the image classification apparatus comprising:
a processor; and
a non-transitory memory having stored thereon executable instructions, which when executed by the processor, cause the processor to function as:
> a receiving unit configured to receive images selected by a user from among a plurality of accumulated images;
> a first extraction unit configured to extract first features from each of the received images;
> a specification unit configured to specify, from among the accumulated images, a relevant image for each received image;
> a second extraction unit configured to extract second features from each of the specified relevant images;
> a calculation unit configured to obtain a third feature by calculation using locality of the extracted first and second features, the third feature being distinctive of a subject of the received images; and
> a model creation unit configured to create model data based on the third feature, wherein for each of the received images, the calculation is performed by matching between the first features and the second features, the first features extracted by the first extraction unit are features of respective areas defined in each received image, and the second features extracted by the second extraction unit are features of respective areas defined in each relevant image, the locality of the features is represented by a color histogram, and the calculation unit compares color distribution of the areas defined in each received image and color distribution of the areas defined in the corresponding relevant image before the matching, and excludes a second feature corresponding to a mismatching area from the matching, the mismatching area being an area of the corresponding relevant image whose color distribution does not match the color distribution of an area defined in each received image.

8. An image classification apparatus for classifying images with use of model data, the image classification apparatus comprising:

a processor; and a non-transitory memory having stored thereon executable instructions, which when executed by the processor, cause the processor to function as:

a receiving unit configured to receive images selected by a user from among a plurality of accumulated images;

a first extraction unit configured to extract first features from each of the received images;

a specification unit configured to specify, from among the accumulated images, a relevant image for each received image;

a second extraction unit configured to extract second features from each of the specified relevant images;

a calculation unit configured to obtain a third feature by calculation using locality of the extracted first and second features, the third feature being distinctive of a subject of the received images;

a model creation unit configured to create model data based on the third feature;

a computing unit configured to compute, based on all features of the accumulated images, a value indicating a common feature; and a determination unit configured to determine, with use of the computed value, a level of commonality of each of the first features extracted by the first extraction unit, wherein the calculation unit obtains the third feature by increasing weight of a first feature whose commonality is low, and decreasing weight of a first feature whose commonality is high.

9. The image classification apparatus of claim 8, wherein the computing unit classifies, with use of a classifier, said all features into groups each having certain similarity, and determines, as the common feature, a feature whose quantity is equal to or greater than a predetermined quantity or whose frequency of appearance is equal to or greater than predetermined frequency in each group.

10. The image classification apparatus of claim 8, wherein the computing unit classifies said all features of the accumulated images into groups in units of events, each image belonging to an event, and computes the value indicating the common feature with use of a feature whose quantity is equal to or greater than a predetermined quantity or whose frequency of appearance is equal to or greater than predetermined frequency in each group.

11. The image classification apparatus of claim 10, wherein the events are defined based on at least one of time intervals of photography, frequency of photography within a specific time period, the number of people appearing in images taken within a specific time period, the number of objects appearing in images taken within a specific time period, a variety of people appearing in images taken within a specific period, and frequency of objects appearing in images taken within a specific time period, or at least one of camera parameters during photography, geometrical information of photography locations, transition information, compositional information of images, and information of locations at which features appear in images.

12. An image classification apparatus for classifying images with use of model data, the image classification apparatus comprising:

a processor; and a non-transitory memory having stored thereon executable instructions, which when executed by the processor, cause the processor to function as:

a receiving unit configured to receive images selected by a user from among a plurality of accumulated images;

a first extraction unit configured to extract first features from each of the received images;

a specification unit configured to specify, from among the accumulated images, a relevant image for each received image;

a second extraction unit configured to extract second features from each of the specified relevant images;

a calculation unit configured to obtain a third feature by calculation using locality of the extracted first and second features, the third feature being distinctive of a subject of the received images;

a model creation unit configured to create model data based on the third feature;

a classification unit configured to classify the accumulated images by judging whether each of the accumulated images matches the created model data;

a display unit configured to display an identifier of the model data and images that match the model data; and a correction receiving unit configured to receive correction information relating to correction of the model data from displayed images, wherein the model creation unit updates the created model data based on the correction information received by the correction receiving unit.

13. An image classification method for use in an image classification apparatus for classifying images with use of model data, the image classification method comprising the steps of:

receiving images selected by a user from among a plurality of accumulated images;

extracting first features from each of the received images;

specifying, from among the accumulated images, a relevant image for each received image;

extracting second features from each of the specified relevant images;

obtaining a third feature by calculation using locality of the extracted first and second features, the third feature being distinctive of a subject of the received images;

creating model data based on the third feature;

computing, based on all features of the accumulated images, a value indicating a common feature; and determining, with use of the computed value, a level of commonality of each of the extracted first features, wherein the third feature is obtained by increasing weight of a first feature whose commonality is low, and decreasing weight of a first feature whose commonality is high.

14. An integrated circuit for classifying images with use of model data, the integrated circuit comprising:
a processor; and
a non-transitory memory having stored thereon executable instructions, which when executed by the processor, cause the processor to function as:
  a receiving unit configured to receive images selected by a user from among a plurality of accumulated images;
  a first extraction unit configured to extract first features from each of the received images;
  a specification unit configured to specify, from among the accumulated images, a relevant image for each received image;
  a second extraction unit configured to extract second features from each of the specified relevant images;
  a calculation unit configured to obtain a third feature by calculation using locality of the extracted first and second features, the third feature being distinctive of a subject of the received images;
  a model creation unit configured to create model data based on the third feature;
  a computing unit configured to compute, based on all features of the accumulated images, a value indicating a common feature; and
  a determination unit configured to determine, with use of the computed value, a level of commonality of each of the first features extracted by the first extraction unit, wherein
  the calculation unit obtains the third feature by
    increasing weight of a first feature whose commonality is low, and
    decreasing weight of a first feature whose commonality is high.

15. A model creation apparatus, the model creation apparatus comprising:
a processor; and
a non-transitory memory having stored thereon executable instructions, which when executed by the processor, cause the processor to function as:
  a receiving unit configured to receive images selected by a user from among a plurality of accumulated images;
  a first extraction unit configured to extract first features from each of the received images;
  a specification unit configured to specify, from among the accumulated images, a relevant image for each received image;
  a second extraction unit configured to extract second features from each of the specified relevant images;
  a calculation unit configured to obtain a third feature by calculation using locality of the extracted first and second features, the third feature being distinctive of a subject of the received images;
  a model creation unit configured to create model data based on the third feature;
  a computing unit configured to compute, based on all features of the accumulated images, a value indicating a common feature; and
  a determination unit configured to determine, with use of the computed value, a level of commonality of each of the first features extracted by the first extraction unit, wherein
  the calculation unit obtains the third feature by
    increasing weight of a first feature whose commonality is low, and
    decreasing weight of a first feature whose commonality is high.

16. An image classification method for classifying images with use of model data on a cloud-based server, the image classification method comprising:
  receiving images selected by a user from among a plurality of accumulated images;
  extracting first features from each of the received images;
  specifying, from among the accumulated images, a relevant image for each received image;
  extracting second features from each of the specified relevant images;
  obtaining a third feature by calculation using locality of the extracted first and second features, the third feature being distinctive of a subject of the received images;
  creating model data based on the third feature;
  computing, based on all features of the accumulated images, a value indicating a common feature; and
  determining, with use of the computed value, a level of commonality of each of the extracted first features, wherein
  the third feature is obtained by
    increasing weight of a first feature whose commonality is low, and
    decreasing weight of a first feature whose commonality is high.

* * * * *